United States Patent

Yuasa et al.

[11] Patent Number: 5,878,198
[45] Date of Patent: *Mar. 2, 1999

[54] INFORMATION PROCESSING APPARATUS AND METHOD AND MEMORY MEDIUM STORING INFORMATION PROCESSING PROGRAM

[75] Inventors: Keiichiro Yuasa, Tokyo; Koichiro Matsuzaki, Chigasaki; Kenta Hara, Kawasaki; Takeyuki Nagashima, Tokyo; Hiroki Koyano, Sagamihara; Keiichi Takashima, Kawasaki; Hitoshi Osaka, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 574,908

[22] Filed: Dec. 19, 1995

[30] Foreign Application Priority Data

| Dec. 21, 1994 | [JP] | Japan | 6-318317 |
| Dec. 21, 1994 | [JP] | Japan | 6-318319 |
| Jan. 31, 1995 | [JP] | Japan | 7-034238 |
| Jan. 31, 1995 | [JP] | Japan | 7-034249 |
| Jan. 31, 1995 | [JP] | Japan | 7-034251 |

[51] Int. Cl.[6] .................................................. G06K 15/00
[52] U.S. Cl. .............................................. 395/117; 395/101
[58] Field of Search ..................................... 395/101, 112, 395/110, 109, 117; 707/505, 506, 508, 509, 517, 520, 522, 524; 400/61, 77, 62, 65, 67, 76, 70; 345/435

[56] References Cited

U.S. PATENT DOCUMENTS 5,144,693  9/1992  Morgan .................................. 395/767

Primary Examiner—Arthur G. Evans
Attorney, Agent, or Firm—Fitzpatrick, Cella, Harper & Scinto

[57] ABSTRACT

There is disclosed an information processing apparatus comprising a setting device for setting, for each predetermined unit, attribute information for a character pattern to be printed in overlay with a form pattern, based on externally entered setting instruction information, a discrimination unit for discriminating whether separation information is set for each predetermined unit, separately from the attribute information and a print control unit adapted, when the discrimination unit identifies that the separation information is set, to generate a character pattern for the predetermined unit for which the separation information is set, based on the attribute information, and to cause overlay printing of the character pattern and the form pattern.

31 Claims, 23 Drawing Sheets

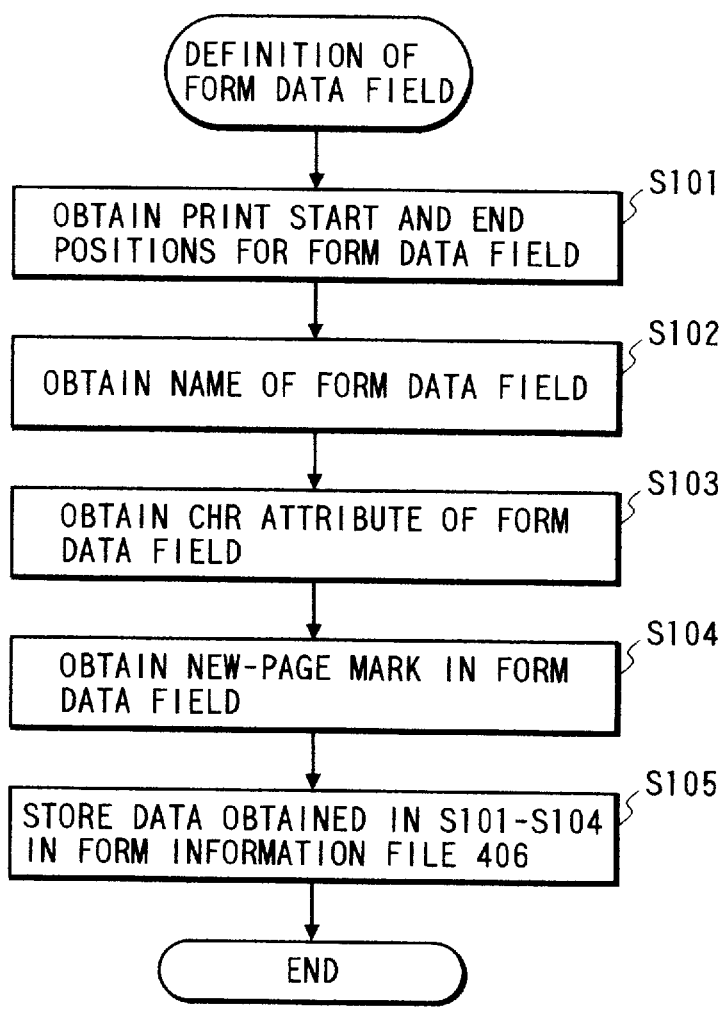

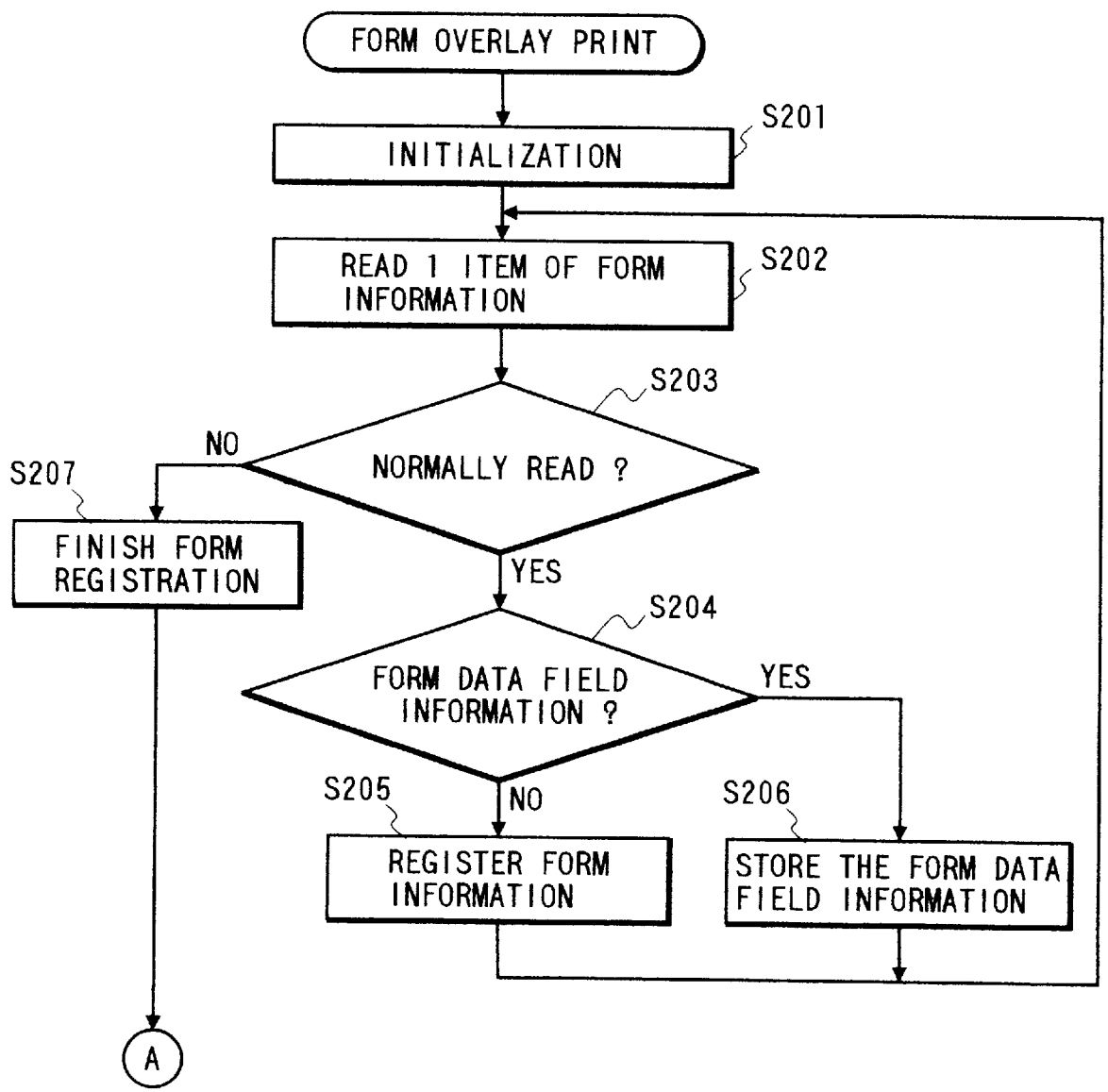

FIG. 7

| FILE | EDIT | DRAW | SET | DISPLAY | HELP |

| MONTH<br>FIX001 | DATE<br>FIX002 | YEAR<br>FIX003 | PROPOSAL FOR IMPROVEMENT (FORM) | | NO. FIX004 |
|---|---|---|---|---|---|
| SECTION<br>FIX005 | | NAME CODE<br>FIX006 | | | |
| RE: VAR001 | | | ☐ INTRODUCED  ☐ NOT INTRODUCED | | EXAMI |
| QUESTION | | IMPROVEMENT<br>VAR004 | RESULT<br>VAR005 | | |
| RE: VAR006 | | | ☐ INTRODUCED  ☐ NOT INTRODUCED | | EXAMI |
| QUESTION<br>VAR009 | | IMPROVEMENT<br>VAR010 | RESULT<br>VAR011 | | |

FIELD: MAKE FIELD

FIG. 8

CHR STYLE

FONT (F):
MS MINCHO

MS GOTHIC
MS MINCHO
HG GOTHIC E
HG ROUND GOTHIC M
HG KAISHO

SIZE (S):
9.6

4
5
6
7
7.2

COLOR (C):
BLACK

CHR DECORATION
☐ BOLD (B)
UNDERLINE (U)
NO UNDERLINE

FIG. 10

DEFINITION OF PROPERTY

☐ SET NEW-PAGE MARK

FIELD TYPE (F): VARIABLE

DISPLAY TYPE (D):

FIELD NAME (N): PROPOSAL 1

OK

CANCEL

FIG. 11

MONTH  DATE  YEAR    PROPOSAL FOR IMPROVEMENT (FORM)    NO.

| SECTION | NAME (CODE) | | |
|---|---|---|---|
| RE: | ☐INTRODUCED ☐NOT INTRODUCED | | EXAMINER'S NOTE |
| PROBLEM | IMPROVEMENT | RESULT | |
| RE: | ☐INTRODUCED ☐NOT INTRODUCED | | EXAMINER'S NOTE |
| PROBLEM | IMPROVEMENT | RESULT | |
| RE: | ☐INTRODUCED ☐NOT INTRODUCED | | EXAMINER'S NOTE |
| PROBLEM | IMPROVEMENT | RESULT | |
| RE: | ☐INTRODUCED ☐NOT INTRODUCED | | EXAMINER'S NOTE |
| PROBLEM | IMPROVEMENT | RESULT | |
| RE: | ☐INTRODUCED ☐NOT INTRODUCED | | EXAMINER'S NOTE |
| PROBLEM | IMPROVEMENT | RESULT | |

FIG. 12

| MONTH | DATE | YEAR | PROPOSAL FOR IMPROVEMENT (FORM) | NO. 5 |
|---|---|---|---|---|
| 99 | 99 | 9999 | | |

| SECTION | NAME (CODE) | |
|---|---|---|
| CORP. | YUASA, KEIICHIRO (99999) | |

| RE: SAMPLE DATA (1) | ■ INTRODUCED □ NOT INTRODUCED | EXAMINER'S NOTE |
|---|---|---|
| QUESTION | IMPROVEMENT | RESULT | |
| ABC··· | PQR··· | XYZ··· | |

| RE: SAMPLE DATA (2) | ■ INTRODUCED □ NOT INTRODUCED | EXAMINER'S NOTE |
|---|---|---|
| QUESTION | IMPROVEMENT | RESULT | |
| ABC··· | PQR··· | XYZ··· | |

| RE: SAMPLE DATA (3) | ■ INTRODUCED □ NOT INTRODUCED | EXAMINER'S NOTE |
|---|---|---|
| QUESTION | IMPROVEMENT | RESULT | |
| ABC··· | PQR··· | XYZ··· | |

| RE: SAMPLE DATA (4) | ■ INTRODUCED □ NOT INTRODUCED | EXAMINER'S NOTE |
|---|---|---|
| QUESTION | IMPROVEMENT | RESULT | |
| ABC··· | PQR··· | XYZ··· | |

| RE: SAMPLE DATA (5) | ■ INTRODUCED □ NOT INTRODUCED | EXAMINER'S NOTE |
|---|---|---|
| QUESTION | IMPROVEMENT | RESULT | |
| ABC··· | PQR··· | XYZ··· | |

FIG. 13

PROPOSAL FOR IMPROVEMENT (FORM)     NO. 5

MONTH 99   DATE 99   YEAR 9999

| SECTION CORP. | NAME (CODE) YUASA, KEIICHIRO (99999) | |
|---|---|---|

| RE:SAMPLE DATA (1)    ■INTRODUCED □NOT INTRODUCED | EXAMINER'S NOTE |
|---|---|
| QUESTION: ABC···    IMPROVEMENT: PQR···    RESULT: XYZ··· | |

| RE:SAMPLE DATA (2)    ■INTRODUCED □NOT INTRODUCED | EXAMINER'S NOTE |
|---|---|
| QUESTION: ABC···    IMPROVEMENT: PQR···    RESULT: XYZ··· | |

| RE:SAMPLE DATA (3)    ■INTRODUCED □NOT INTRODUCED | EXAMINER'S NOTE |
|---|---|
| QUESTION: ABC···    IMPROVEMENT: PQR···    RESULT: XYZ··· | |

| RE:SAMPLE DATA (4)    ■INTRODUCED □NOT INTRODUCED | EXAMINER'S NOTE |
|---|---|
| QUESTION: ABC···    IMPROVEMENT: PQR···    RESULT: XYZ··· | |

| RE:SAMPLE DATA (5)    ■INTRODUCED □NOT INTRODUCED | EXAMINER'S NOTE |
|---|---|
| QUESTION: ABC···    IMPROVEMENT: PQR···    RESULT: XYZ··· | |

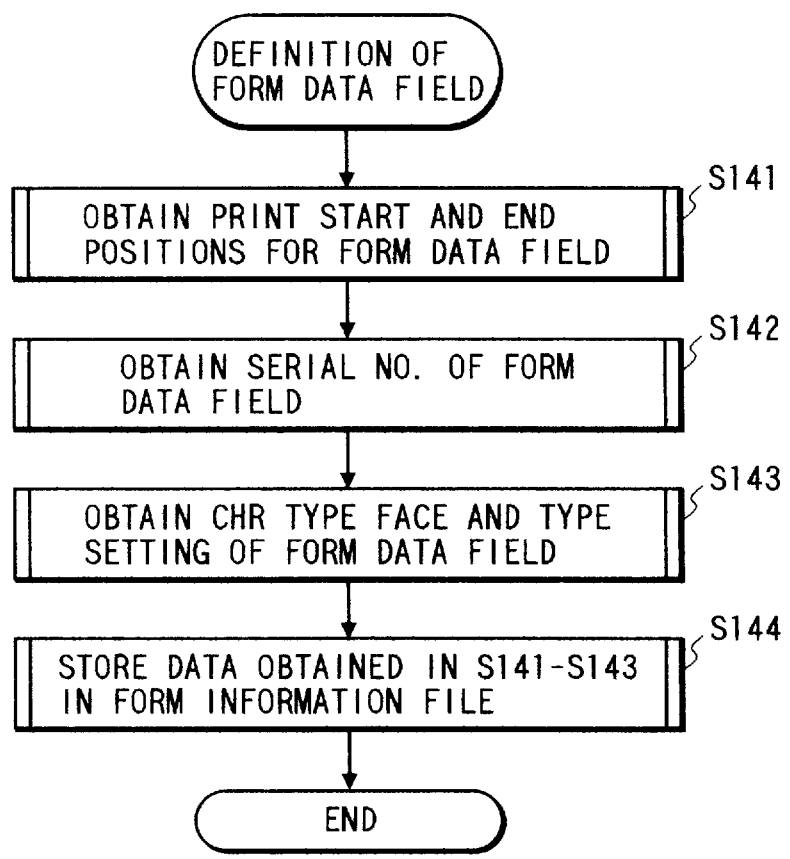

INFORMATION PROCESSING APPARATUS AND METHOD AND MEMORY MEDIUM STORING INFORMATION PROCESSING PROGRAM

BACKGROUND OF THE INVENTION

1. Field of the Invention

The present invention relates to an information processing apparatus and method capable of form overlay printing by overlaying a form pattern and a character pattern, and a memory medium storing an information processing program adapted for use therein.

2. Related Background Art

In the case of printing a form overlay pattern (for example as shown in FIG. 12) obtained by overlaying a form pattern (for example the form of a proposal document for improvement as shown in FIG. 11) and form data (for example a character pattern consisting of plain text data), it has conventionally been required that the font and the print format of the form data are fixed.

For example, the character patterns of the form data, to be printed in the form pattern (for example the form of a proposal document for improvement as shown in FIG. 11) have a same size.

In the conventional form overlay print control system, an exclusive form information design system can be utilized in the designing of form information and a highly advanced form can be designed with various components such as a line portion, an arc, a solid colored area and plural character fonts, but the form data to be printed thereon (for example character patterns consisting of plain text data) can only utilize a single character font.

Although the printing apparatus has acquired various functions by the recent technological advancement and has become capable of printing various character fonts, the conventional form overlay print control system can only utilize fixed character font and fixed print format for the form data, and such form data (for example character patterns consisting of plain text data) are overlaid, utilizing a space code, a tabulator code, a line feed code, a new page code etc., in a predetermined position on the form pattern (for example the form of a proposal document for improvement).

Such conventional form overlay print control system has been associated with a drawback in that it has been incapable of mixing form data of plural character attributions in the form pattern, in order to partially emphasize the form data.

Also in the conventional information processing system, there is known a printing technology called overlay printing, in which a form consisting of vertical and horizontal form lines is registered in advance in a printer, whereby the form data to be printed in such form and the registered form are printed in an overlaid format.

In such conventional overlay printing, however, it is necessary to register the form in advance in the printer prior to the printing of the form data, and such registering operation is cumbersome.

Also in such conventional overlay printing, the form data cannot be utilized for generating other form data. More specifically, it is not possible to automatically generate new form data by arbitrarily combining the already entered plural form data according to the purpose, so that the form data cannot be utilized again.

Consequently, in case of overlay printing of form data groups of A+B+C+D+E+F . . . and A+B+C+d+e+f . . . , it is necessary to enter the form data A+B+C every time, so that the input of the form data is cumbersome.

Also in the case of using an application program on a computer system and printing the result of processing, there have been encountered following drawbacks.

As an example, let us consider a case of preparing an application program for managing a personal address list, and printing an address report consisting of print data of "name", "telephone number" and "address". After the printing of a line of a "name" and a corresponding "address", if the "name" on a next line has the same "address", it is often desired to print "ibid." for the address. Since the conventional printing apparatus can only print the print data prepared by the user, such requirement has been met by increasing the burden of development of each application program. Also in the above-mentioned example, if it is desired to print "same as above" instead of "ibid.", it is likewise necessary to individually amend the application program, so that there is required increased maintenance work for the application program.

SUMMARY OF THE INVENTION

In consideration of the foregoing, an object of the present invention is to mixedly provide form data of plural character attributions within a form pattern by utilizing different character fonts or different print formats in the different parts of the form data, thereby enabling partially emphasized printing of the form data.

Another object of the present invention is to enable overlay printing without the form registering operation on the printer.

Still another object of the present invention is, in the overlay printing, to enable automatic generation of new form data by combining already entered plural form data.

Still another object of the present invention is to dispense with the incorporation of a replacement logic for the print data, thereby reducing the burden of development and maintenance of the application program and improving the productivity.

The invention attains these objects by means of a method in which attribute information is set for each of plural character pattern trains that are to be printed in overlay with a form pattern, based on instruction information entered from an external apparatus. For each of the character pattern trains, a discrimination is made as to whether separation information is set for that train, separately from the attribute information (the separation information, where it exists, represents a separation between the train and an adjacent one). Where such separation information is present, that train is generated based on the attribute information, and overlay printing is executed for that character patttern train and the form pattern. An apparatus which performs these steps, and a memory medium storing program control to effect performance of these steps, are also provided.

Also according to the present invention, there is provided an information processing apparatus comprising setting means for setting, for each predetermined unit, character attribution information of a character pattern to be printed in overlay with a form pattern, based on externally entered setting designation information; discrimination means for discriminating whether partition information is set, separately from said attribution information, for each said predetermined unit; and print control means adapted, in case said discrimination means identifies the setting of said partition information, to generate a character pattern of a predetermined unit where said partition information is set, according to said attribution information and to print said character pattern and the form pattern in overlaid manner.

Also according to the present invention there is provided a memory medium storing a program comprising a step for setting, for each predetermined unit, character attribution information of a character pattern to be printed in overlay with a form pattern, based on externally entered setting designation information; a step for discriminating whether partition information is set, separately from said attribution information, for each said predetermined unit; and a step adapted, in case said discrimination step identifies the setting of said partition information, to generate a character of a predetermined unit where said partition information is set, according to said attribution information and to print said character pattern and the form pattern in overlaid manner.

Also according to the present invention, there is provided an information processing apparatus comprising form memory means for storing a form prepared in advance; form data memory means for storing entered form data; registration means adapted, in case overlay printing is instructed for the form data stored in said form data memory means, to read, from said form memory means, at least a file of the form name designated in the instructed form data and to register said file in the printer; and control means for controlling said printer so as to effect overlay printing at least of the instructed form, registered by said registration means and the instructed form data.

Also according to the present invention, there is provided a memory medium storing a program comprising a step adapted, in case overlay printing is instructed for the form data, if the form of at least a form name designated in the instructed form data is stored in the memory means, to read the instructed form from the memory means and to register said form in the printer, thereby effecting overlay printing together with the instructed form data.

Also according to the present invention, there is provided an information processing apparatus comprising memory means adapted to store plural form data files, at the overlay printing of form data by a printer on a form prepared in advance; designation means for designating a form data file to be used as a basis among the plural form data files stored in said memory means; detection means for detecting a keyword for linking the form data file designated by said designation means with other form data files; generation means for generating new form data by reading, from said memory means, the form data of a file name designated by the keyword detected by said detection means and inserting said form data into the form data file taken as the basis; and deletion means for deleting said keyword and the name from the new form data generated by said generation means.

Also according to the present invention there is provided a memory medium storing a program comprising a step for designating a form data file to be taken as a basis from plural stored form data files, at the overlay printing of form data by a printer on a form prepared in advance; a step for detecting a keyword for linking the designated form data file with other form data files; a step for generating new form data by reading form data of a file name designated by the detected keyword and inserting said form data into the form data file taken as the basis; and a step for deleting said keyword and the name from the generated new form data.

Also according to the present invention there is provided an information processing apparatus comprising a first discrimination means for discriminating an operation mode for replacing the print data of a same content with designated print data; second discrimination means adapted, in case said first discrimination means identifies the operation mode for replacing the print data of a same content with designated print data, to discriminate whether the previously printed data are same as the print data to be currently printed; and storage means adapted, in case said second discrimination means identifies that the previously printed data are same as the current print data, to store designated replacement print data in a print output area.

Also according to the present invention there is provided a memory medium storing a program comprising a step for discriminating an operation mode for replacing the print data of a same content with designated print data; a step adapted, in case the above-mentioned step identifies the operation mode for replacing the print data of a same content with designated print data, to discriminate whether the previously printed data are same as the print data to be currently printed; and a step adapted, in case the above-mentioned step identifies that the previously printed data are same as the current print data, to store designated replacement print data in a print output area.

BRIEF DESCRIPTION OF THE DRAWINGS

FIG. 1 is a flow chart showing the functions of a form information design system in a first embodiment of the present invention;

FIG. 7 is a view showing an example of the window display, to be used for designating the print start and end positions of the form data, in an embodiment of the present invention;

FIG. 8 is a view showing an example of the window display, to be used for designating the character type face in an embodiment of the present invention;

FIG. 10 is a view showing an example of the window display, to be used for setting a new page code and a data field name, in an embodiment of the present invention;

FIG. 11 is a view showing an example of the form pattern in an embodiment of the present invention;

FIG. 12 is a view showing an example of the printed result of a form overlay pattern in a conventional form overlay print system;

FIG. 13 is a view showing an example of the printed result of a form overlay pattern in a form overlay print system constituting an embodiment of the present invention;

FIG. 14 is a flow chart showing the function of a form information design system in a second embodiment of the present invention;

DESCRIPTION OF THE PREFERRED EMBODIMENTS

Prior to the description of the embodiments of the present invention, there will be explained the definitions of the terms employed in the embodiments.

(Form overlay printing)

A page printer, such as a laser beam printer, is generally provided with a function called page registration or form registration, which allows registration of form information such as frame lines for example of a business form.

In printing character patterns of a plain text by such printer, a function called page information calling or form information calling may be utilized to print the previously registered form information of the business form and the plain text character patterns in superposed manner. Such superposed printing is called the form overlay printing.

(Form information)

Form information means information on a form utilized in the form overlay printing. In general, the form information is prepared by an exclusive form information design system.

(Form information file)

Form information file means a file in which the designed form information is stored.

(Form data)

Form data means plain text data utilized in the form overlay printing. In general, the plain text data do not contain graphic information but are simply composed of space codes, tabulator codes, line feed codes, new page codes and character codes.

(Form data file)

Form data file means a file in which the form data, obtained as the result of processing with various business application programs, are stored.

(Character type face)

Character type face means means the shape of the printed character, defined by the character font, character size (point), and character modification such as bold or italic.

(Print layout)

Print format means a set of character layout information such as the character pitch (CPI), line pitch (LPI), direction of printing (horizontal or vertical), print position designation such as alignment at the right- or left-hand end or centering.

(Form data item)

Form data item means a grouped data unit, for each print location on the page, in the form data.

(Form data field)

Form data field means a set of print coordinate information, field name and character attribution of the form data, defined on the form information at the designing thereof.

(Form data print coordinate)

Form data print coordinate means the coordinate position where a specified form data item is printed on the form pattern.

(Form data serial number)

Form data serial number means serial numbers respectively assigned to all the form data items within the form information.

(Form data character attribute)

Form data character attribute means a set of the character type face and the print layout of a form data item.

(Form data field name)

Form data field name means a name given to each form data item.

In the following an embodiment of the present invention will be explained with reference to FIGS. 1 to 10.

Figure 3:
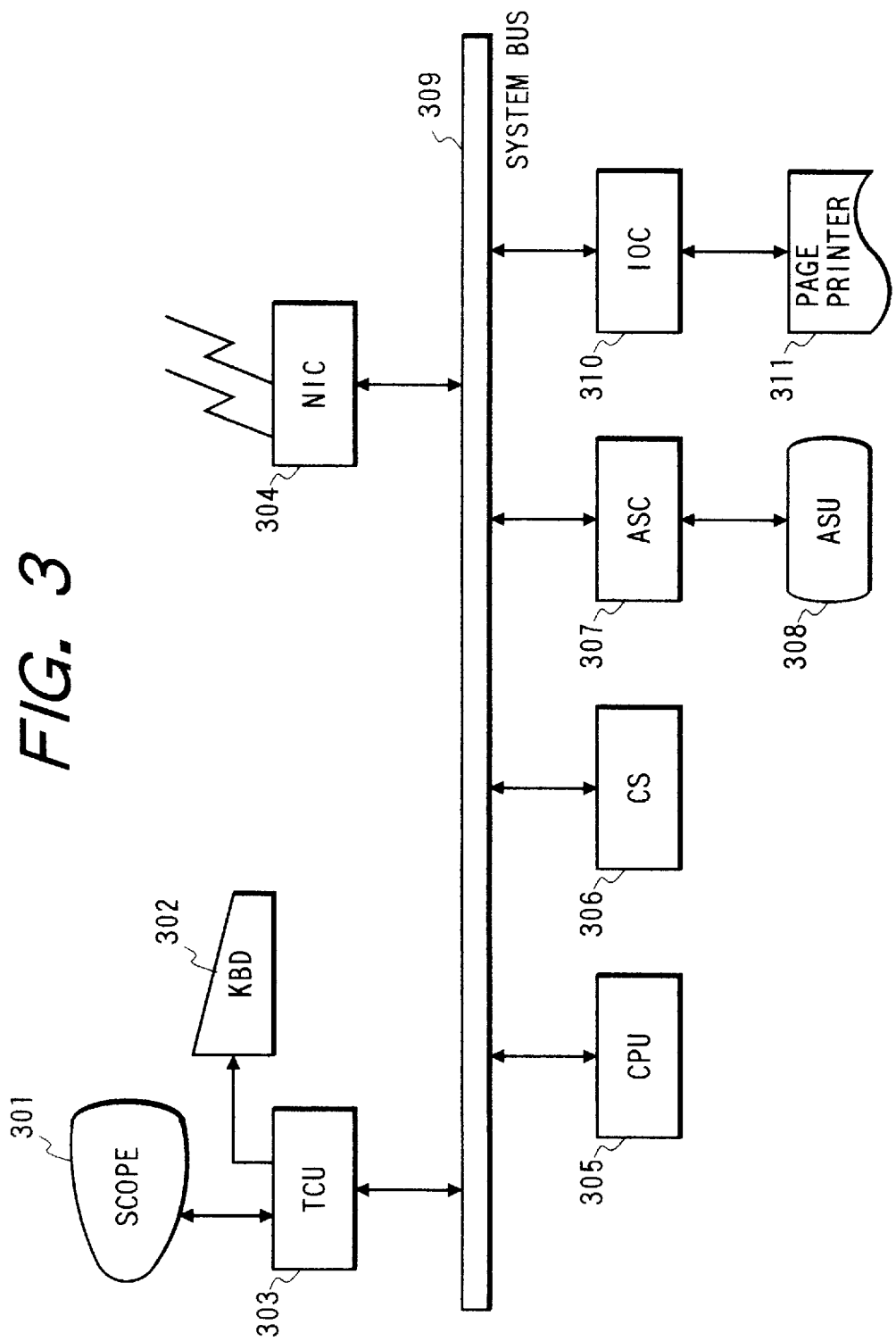
FIG. 3 is a block diagram of a computer system including a form information design system and a form overlay print system in an embodiment of the present invention.

FIG. 3 shows the configuration of a computer system including a form information design system and a form overlay print control system.

In FIG. 3, a CPU 305 controls the entire system, according to control programs (as shown by flow charts in FIGS. 1, 2A, 2B, 14, 15, 17, 20, 21 and 22) stored in a main memory or a central storage (CS) 306.

The central storage 306 also provides a memory area for storing application programs loaded from an auxiliary storage unit (ASU) 308 through an auxiliary storage controller (ASC) 307. This memory area contains various application programs such as the form information design system and the form overlay print system to be explained later, and the form data generating program.

The control programs and the application programs on the central storage 306 are operated from the instructions from following two devices.

The first is an operator console unit including a display unit (SCOPE) 301, a keyboard (KBD) 302, and a console controller (TCU: terminal control unit) 303.

The second is a network interface controller (NIC) 304 for fetching the instruction from an external computer system, connected through a network such as a LAN or a WAN, into the present computer system.

A page printer 311 is connected to the present computer system through an input/output controller (IOC) 310 and is adapted to register, in advance, the form information entered from the computer system, in a memory, and to generate a form overlay pattern by overlaying a character pattern of the form data entered from the computer system and the form information registered in advance in the memory, thereby effecting form overlay printing.

A system bus 309 is used for transferring data and program commands among the TCU 309, CPU 305, CS 306, ASC 307 and IOC 310.

Figure 4:
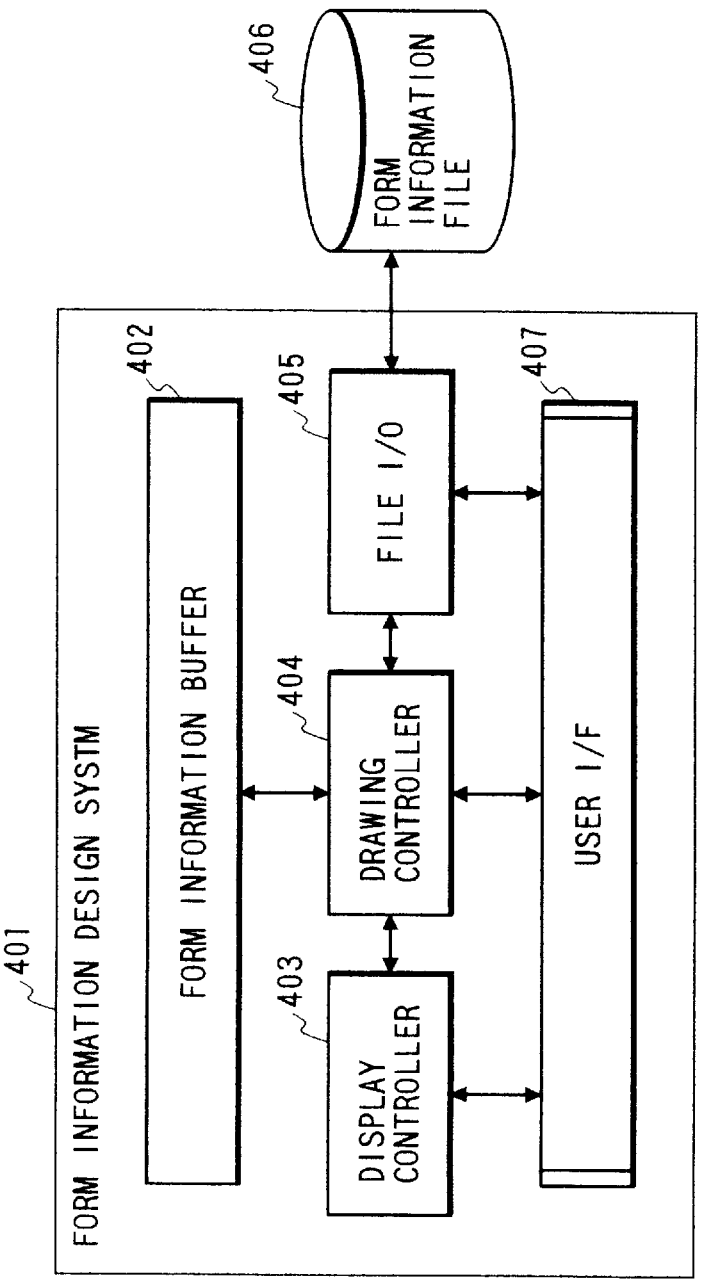
FIG. 4 is a block diagram of a form information design system constituting an embodiment of the present invention.

FIG. 4 is a block diagram showing the configuration of the form information design system.

The entire form information design system 401 is present on the central storage 306 in FIG. 3, when the system is utilized.

The CPU 305 controls, based on a user interface unit 407 (entire control program) provided as will be explained later in the form information design system 401, a form information buffer 402, a display control unit 403 (display control program), a drawing controller 404 (drawing control program), and a file I/O unit 405 (file input/output control program).

The CPU 305 receives, through the TCU 303, an execution command of the form information design system and a form information preparation command, entered by designation means such as an unrepresented pointing device, based on the display controller 403 (display control program), analyzes various commands such as a setting command or a form information preparation command received according to the user interface unit 407 (entire control program), and sends internal process commands to the drawing controller 404 (drawing control program) and the file I/O unit 405 (file I/O control program).

Also based on the user interface unit 407 (entire control program), the CPU 305 returns the result of processing in the drawing controller 404 (drawing control program) and the file I/O unit 405 (file I/O control program) to the display controller 403 (display control program) and displays, based thereupon, the result of processing on the SCOPE 301.

More specifically, the display controller 403 (display control program) is a program for displaying, on the SCOPE 301 in FIG. 3, a form pattern (such as the form pattern of a proposal document for improvement shown in FIG. 7) based on the form information currently designed in the form information buffer 402 through the drawing controller 404 (drawing control program), and accepting various commands such as a setting command and a form information preparation command entered by the user through the keyboard 302 in FIG. 3 or an unrepresented pointing device.

The drawing controller 404 (drawing control program) is a program for managing the form information buffer 402, effecting input/output of all the form information elements into or from the form information buffer 402, and effecting bidirectional transfer of these elements with the display control unit 403 (display control program) and the file I/O unit 405 (file I/O control program) under the control of the user interface unit 407 (entire control program).

The file I/O unit 405 (file I/O control program) is a program for writing or reading the form information for example of the proposal document for improvement shown in FIG. 7, under current designing on the form information buffer 402, into or from the form information file 406 on the ASU 308 in FIG. 3 through the drawing controller 404, under the control of the user interface 407 (entire control program).

Figure 5:
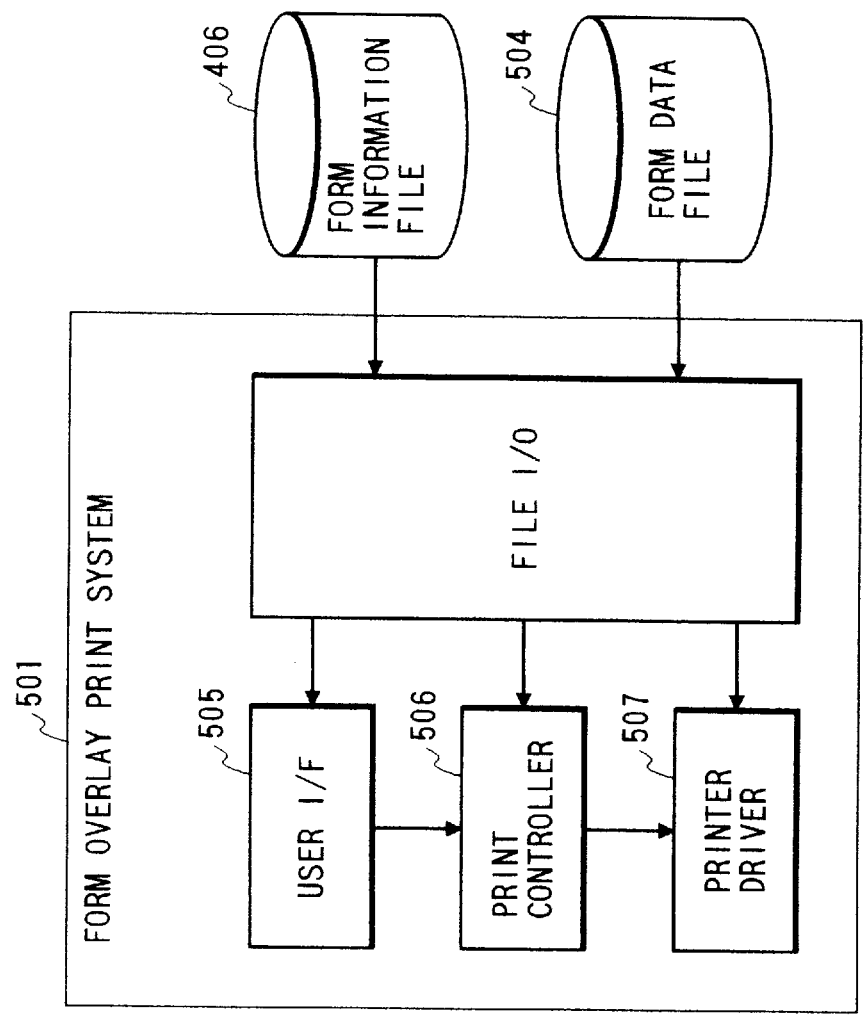
FIG. 5 is a block diagram of a form overlay print system constituting an embodiment of the present invention.
Figure 6:
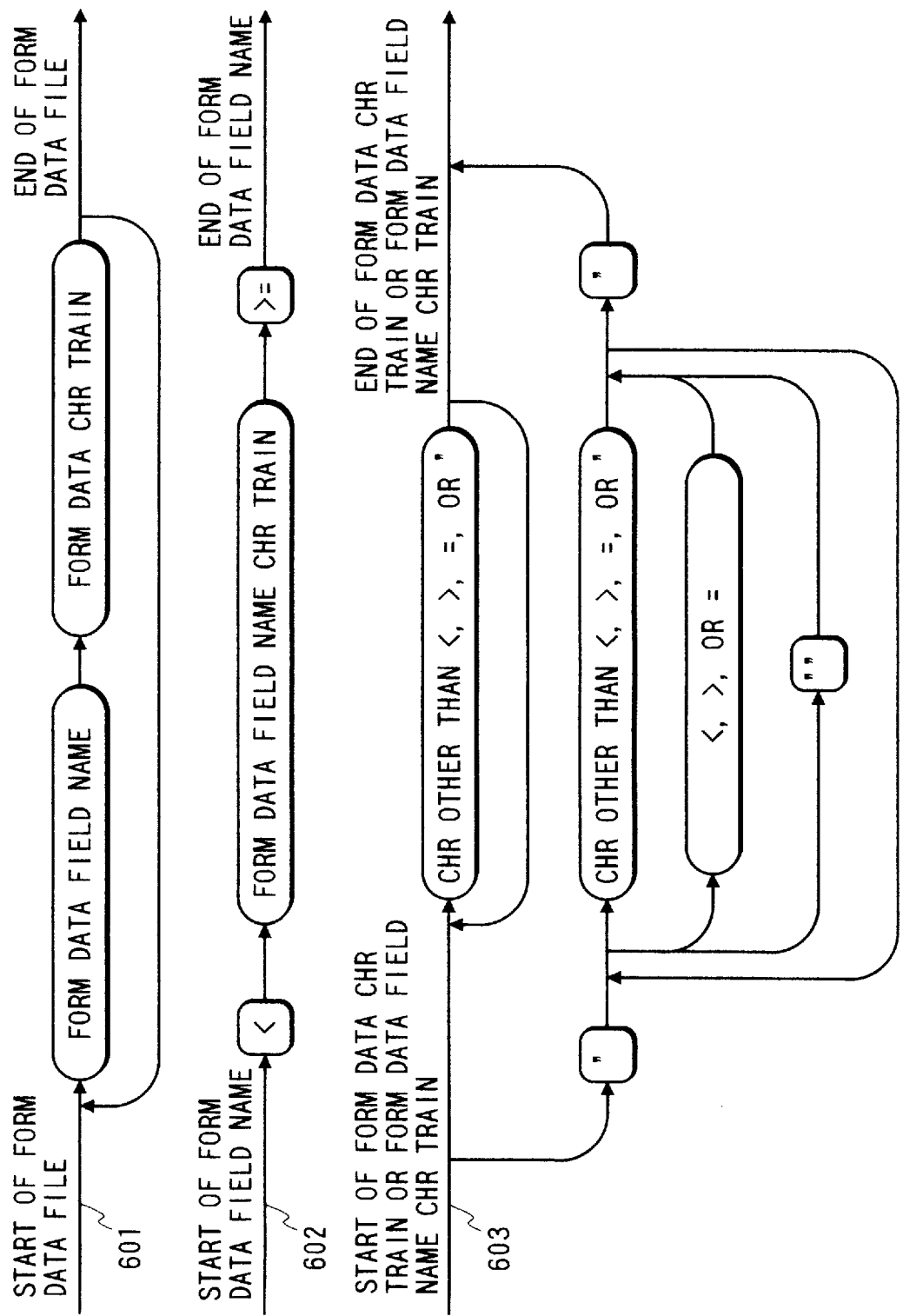
FIG. 6 is a view showing phase transitions indicating the grammer in a form data file, utilized in the form overlay printing in an embodiment of the present invention.

FIG. 5 shows the configuration of the form overlay print system 501 of the present embodiment, which is present on the central storage 306 in FIG. 6 when this system is used.

The CPU 305 controls a file I/O unit 502 (file I/O control program), a user interface 505 (control program) and a printer driver 507 (printer control program), based on the form overlay print controller 506 (entire control program) present, as will be explained later, in the form overlay print system 505.

The user interface unit 505 is a program for displaying, on the SCOPE 301 in FIG. 3, a list of the form information file names and the form data file names entered from the form information file 406 and the form data file 504 in the ASU 308 through the file I/O unit 502, and accepting the selection of the form information file name and the form data file name entered by the user through the keyboard 302 in FIG. 3 or the unrepresented pointing device, for supply to the file I/O unit 502.

The file I/O unit 502 is a program for reading, based on the form information file name and the form data file name entered through the user interface 501, reading the designated form information from the form information file 406 and the designated form data from the form data file 504, for supply to the overlay print controller 506.

The form overlay print controller 506 is a program for sending the form information, received through the file I/O unit 502, through the printer driver 507 to the page printer 311 for registration therein, and for analyzing the form data (character codes), received through the file I/O unit 502 to generate intermediate data (form data so processed as to facilitate generation of bit map data in the printer driver 507), for supply to the printer driver 507.

[first embodiment]

FIG. 6 is a view showing the phase transitions indicating the grammer in the form data file, to be used in the form overlay printing.

In the present embodiment, the grammer in the form data file, to be used in the form overlay printing, is newly so defined as to divide the text data in the form data file into the form data items.

In FIG. 6, 601, 602 and 603 indicate phase transitions representing the grammer in the form data file in the first embodiment.

601 indicates that the entire form data file is constructed by the repetition of form data items, each composed of a form data field name and a form data character train.

602 indicates the structure of the form data field name.

The form data field name is constructed by a character train of the form data field name, placed between a symbol < and symbols >=.

603 indicates that, in each form data item, the form data character train indicating the data content and the form data field name character train are to be written without change if these character trains do not contain a symbol ", <, > or =, that a form data character train containing any of such symbols is to be placed between " and ", and that a symbol " in a character train placed between " and " is to be written as two double quotation marks "".

In the following the detailed functions of the first embodiment will be explained with reference to flow charts shown in FIGS. 1, 2A and 2B.

FIG. 1 is a flow chart showing the setting operations for the definition for a form data field, a form data field name and a new page mark for each form data item, at the designing of form information in the form information design system of the present embodiment. A control program indicated by this flow chart corresponds to the user interface unit 407 in FIG. 4, and is executed by the CPU 305, in response to the entry of a setting command, for example for setting the definition of the form data field, through the display controller 403.

After the user designates a range for example with an unrepresented pointing device as shown in FIG. 7, the CPU 305, in a step S101, determines print start and end positions of the form data field (indicated by a broken-lined frame in FIG. 7), and stores the above-mentioned print start and end positions, as print coordinate positions of the form data field, in the form information buffer 402 through the drawing controller 404 in FIG. 4, in relation to the form information. The image field shown in FIG. 7 is displayed on the SCOPE 301.

Then, in a step S102, the CPU 305 stores a character train (for example PROPOSAL 1) of the form data field name, entered by the user with the unrepresented pointing device as shown in FIG. 10, through the display controller 403 in FIG. 4, in the form information buffer 402 in FIG. 4 through the drawing controller 404 in FIG. 4, in relation to the form information.

Also the last serial number of the form data field defined currently on the form information (form of the proposal document for improvement) is obtained, and a next serial number is stored, as the serial number of the present form data field, in the form information buffer 402 through the drawing controller 404 in FIG. 4, in relation to the form information.

Thus the form data field corresponding to the range shown in FIG. 7 has the last serial number among the form data fields defined currently on the form of the proposal document for improvement.

Figure 9:
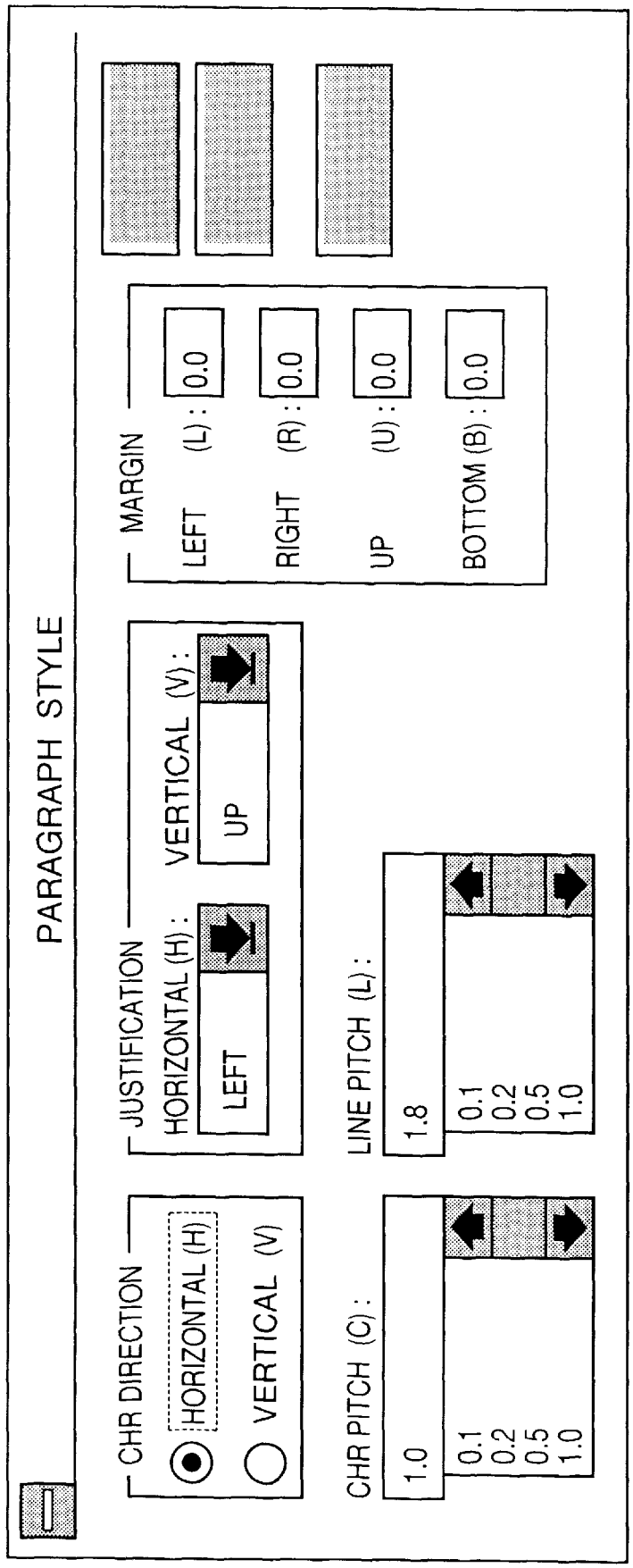
FIG. 9 is a view showing an example of the window display, to be used for designating the print format in an embodiment of the present invention.

Then, in a step S103, the CPU 305 stores set values of the character type face of the form data field, entered by the user with the pointing device on a character type face setting image frame as shown in FIG. 8 and set values of the print layout of the form data field entered by the user with the pointing device on a print layout setting image frame as shown in FIG. 9, in the form information buffer 402 through the drawing controller 404 in FIG. 4, in relation to the form information. The image frames shown in FIGS. 8 and 9 are displayed on the SCOPE 301.

Then, when the user enters a new page mark for defining the form data field as the last one on the printed page, as shown in FIG. 10 with the unrepresented pointing device through the display controller 403, the CPU 305 stores, in a step S104, this new page mark in the form information buffer 402 through the drawing controller 404 in FIG. 4, in relation to the form information.

When the user clicks the pointing devices at a check box for new page mark setting, positioned at the side of an OK button in FIG. 10, a mark X is displayed in the check box. It is also possible to display this check box and a character train "SET NEW PAGE MARK" in gray color if a new page mark is already in another field. It is also possible to accept any number of fields containing the new page mark within a page, and to change the page at the printing of the form data according to the selection of any of such new page marks.

Then, in response to a form information file storage command entered by the user through the display controller 403 in FIG. 4, the CPU 305 stores, in a step S105, a set of the form data field information consisting of the print start position information, print end position information, serial number, character type face set values, print layout set values, form data field name and new page mark stored in the form information buffer 402 in the foregoing steps S101, S102, S103 and S104, together with other form information contained in the form information buffer 402, in the form information file 406 through the drawing controller 404 and the file I/O unit 405 shown in FIG. 4.

As explained in the foregoing, the present embodiment allows to arbitrarily set the character attribute etc. of the form data to be printed each of the form data fields (VAR001–VAR011) within the form of the proposal document shown in FIG. 7.

Figure 2B:
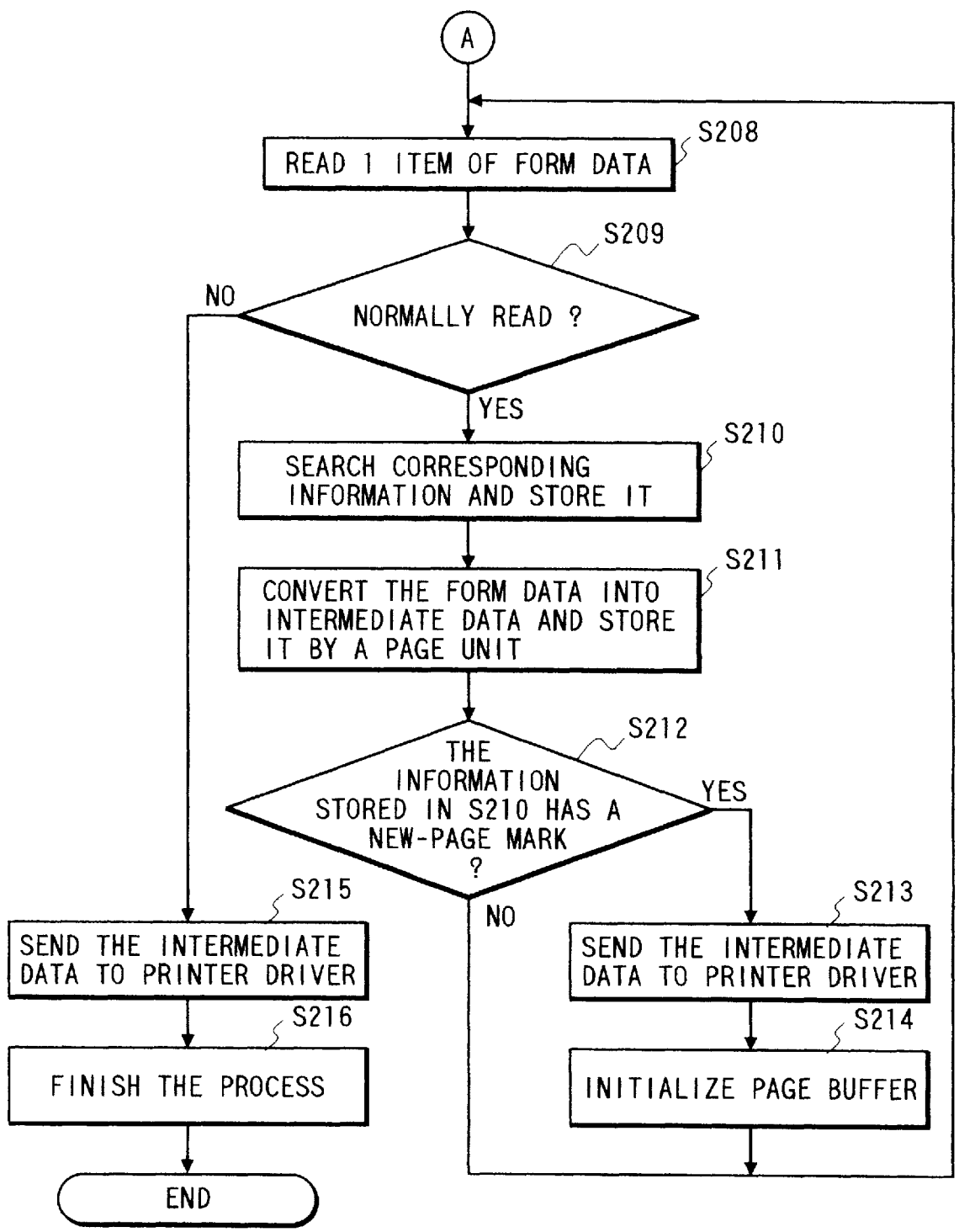
FIG. 2, comprised of FIGS. 2A and 2B, is flow chart showing the functions of a form overlay print system in the first embodiment of the present invention.

FIGS. 2A and 2B are flow charts showing a form overlay printing operation in the form overlay printing system of the present embodiment, by giving different character attribute etc. to each item of the form data file by referring to the form data field information (composed for example of the print start position information, print end position information, serial number, character type face set values, print layout set values, form data field name and new page mark) defined in the form information file. A control program indicated by this flow chart corresponds to the overlay print controller 506 in FIG. 5, and is executed by the CPU 305 in response to the entry of the form information file name, the form data file name and a form overlay print command through the user interface unit 505 in FIG. 5.

In a step S201, the CPU 305 transfers a page registration start command to the page printer 311 through the printer driver 507 in FIG. 5, then initializes an unrepresented holding area in the central storage 306 for holding the form data field information to be utilized in a step S206 to be explained later, also initializes an unrepresented holding area of the CS 306 for holding the form data item to be utilized in a step S208, then enables the readout of the form information file and the form data file, to be used in subsequent steps, from the head thereof through the file I/O unit 502 in FIG. 5, and initializes an unrepresented page buffer in the CS 306, for storing bit map data of a page obtained by developing the form data (character codes) read from the form data file through the file I/O unit 502 in FIG. 5, utilizing font information (dot font or outline font) stored in an unrepresented font memory.

Then, in a step S202, the CPU 305 reads one of the form information from the form information file through the file I/O unit 502, and discriminates, in a step S203, whether the file information has been read properly or could not be read because of a file end or a file abnormality.

If the step S203 identifies proper readout, the CPU 305 in a step S204 discriminates whether the read form information is form data field information.

If so, the CPU 305 in a step S206 stores the form data field information in the unrepresented holding area of the CS 306 and executes the process starting from a step S202. On the other hand, if the step S204 identifies that the read form information is not the form data field information but information indicating the form pattern, the CPU 305 in a step S205 transfers the above-mentioned form information through the printer driver 507 to the page printer 311 for registration in an unrepresented memory therein, and then executes the process starting from the step S202.

If the step S203 identifies that the form information cannot be read, the CPU 305 in a step S207 transfers an end command for the form information registration to the page printer 311 through the printer driver 507, and read the set of the form data field information on the form information held in the step S206, from the unrepresented holding area of the CS 306.

Then, in a step S208, the CPU 305 reads a form data item from the form data file already positioned in the step S201 at the readout start position, according to the grammer shown in FIG. 6, through the file I/O unit 502, and discriminates, in a step S209, whether a form data item could be read properly or could not be read because of a file end or a file abnormality.

If the step S209 identifies proper readout of a form data item, it is held in the unrepresented holding area of the CS 306 initialized in the step S201, and, in a step S210, the CPU 305 searches the name and corresponding information of thus read form data item, from the read form data fields, and stores the form data field information of the coinciding name in the unrepresented holding area of the CS 306 initialized in the step S201.

Then, in a step S211, the CPU 305 converts the form data character train (character codes), held in the foregoing step S209, into intermediate data according to the form data field information hold in the foregoing step S210, then temporarily stores the above-mentioned intermediate data in an unrepresented work area in the CS 306, and discriminates whether the form data field information temporarily held in the step S210 includes a new page mark.

If the step S212 identifies the presence of a new page mark, in a step S213, the CPU 305 develops the intermediate data, temporarily held in the work area of the CS 306, into bit map data (character pattern) through the printer driver 507, based on the print coordinate position, the character type face set values and the print layout set values in the form data field information, and transfers the above-mentioned bit map data to the page printer 311 after temporary holding in the page buffer of the CS 306 thereby causing the print of a form overlay pattern as shown in FIG. 13, in superposition with a form pattern as shown in FIG. 11, generated from the form information registered in advance in the page printer 311. Then, in a step S214, the CPU 305 initializes again the page buffer which was initialized in the step S201, and executes the process starting from the step S208.

If the foregoing step S209 identifies the exhaustion of the form data items to be read, the CPU 305 develops the intermediate data, temporarily stored in the work area of the CS 306 in the step S206, into bit map data (character pattern) based on the print coordinate position, the character type face set values and the print layout set values in the form data field information through the printer driver 507, and transfers the above-mentioned bit map data to the page printer 311 after temporary holding in the page buffer in the CS 306 thereby causing the print of a form overlay pattern as shown in FIG. 13, in superposition with a form pattern as shown in FIG. 11, generated from the form information registered already in the page printer 311.

In a step S216, the CPU 305 terminates the present form overlay pattern printing process by sending a print end command to the page printer 311, and releases the aforementioned form information file and form data file through the file I/O unit 502 shown in FIG. 5.

As explained in the foregoing, the first embodiment enables, in the designing of an overlay form, to define the form data field for each form data item, by the functions shown in FIG. 1. Also by the functions shown in FIG. 2, the first embodiment enables, in the overlay printing, to give a different print attribute to each data item in the form data file while referring to the form data field defined in the overlay form file.

Owing to these functions of the first embodiment, the partially emphasized printing of the form data, which has not been achievable in the conventional overlay printing method, is made possible by utilizing different character type faces or different print layouts respectively in the portions of the form data, and the highly advanced reproducing ability of the page printer, attained by the recent technological advancement, can be exploited not only in the printing of the overlay form but also in the printing of the form data.

As explained in the foregoing, the first embodiment enables, in the form overlay printing, to provide the data items in the form data file with respectively different character attributes, by referring to the form data field information defined in the form information file.

Also in the first embodiment explained above, in the registration of the form information in the page printer 311, the form data field information relating to the form information is collectively stored in the holding area, so that it is no longer necessary to read the form data field information at each reading of the form data item and the number of accesses to the form information file can be reduced.

Also in the first embodiment explained above, each form data item in the form data file is printed, based on the print coordinate position of the form data field on the form information, so that the form data can be printed in an arbitrary direction with respect to the printing sheet, in contrast to the conventional form overlay print system in which the form data can only be printed in a fixed direction with respect to the printing sheet.

For example, in the conventional form overlay print system, if the printing proceeds from the upper end of the printing sheet toward the lower end thereof, it has not been possible to at first print the form data at the lower end and then to print the form data at the upper end.

However, in the form overlay print system of the first embodiment, such inverted printing operation is made possible by defining the form data field at first at the lower end and then at the upper end.

Also in the first embodiment explained above, there can be completely eliminated the overlapping or aberration which has conventionally been encountered in the form overlay printing of the prepared form information and form data.

In the conventional form overlay print system, the print positions of the form information and the form data are not mutually correlated, and the positional alignment is only achieved by the space code, tabulator code, line feed code and new page code in the form data, solely at the responsibility in the preparation of the form data.

In contrast, in the overlay print system of the first embodiment, each form data item of the form data is always overlay printed on the form data field designed according to the form information, so that the overlapping or aberration in printing can be totally eliminated.

[second embodiment]

In FIG. 16, 1601, 1602 and 1603 indicate phase transitions representing the grammer in the form data file in a second embodiment of the present invention.

1601 indicates that the entire form data file is constructed by the repetition of a set of a form data character train and a form data separator. A form data character train constitutes a form data item.

1602 indicates the manner of construction of the form data character train. It is indicated that the form data character train is to be written without change if the train does not contain a symbol, or ", that a form data character train containing any of the symbols , and " is to be placed between " and ", and that a symbol " in a form data character train placed between " and " is to be written as two double quotation marks "".

1603 indicates the manner of representation of the form data separator, which is constituted by, in the second embodiment.

In the following the detailed functions of the second embodiment will be explained with reference to flow charts shown in FIGS. 14 and 15.

FIG. 14 is a flow chart showing the operation for defining the form data field for each form data item, at the designing of form information in the form information design system of the second embodiment. A control program indicated by this flow chart corresponds to the user interface unit 407 in FIG. 4, and is executed by the CPU 305, in response to the entry of a setting command for setting the definition of the form data field, through the display controller 403.

After the user designates a range for example with an unrepresented point device as shown in FIG. 7, the CPU 305, in a step S141, determines print start and end positions of the form data field (indicated by a broken-lined frame in FIG. 7), and stores the above-mentioned print start and end positions, as print coordinate positions of the form data field, in the form information buffer 402 through the drawing controller 404 in FIG. 4, in relation to the form information. The image field shown in FIG. 7 is displayed on the SCOPE 301.

Then, in a step S142, the CPU 305 obtains the last serial number of the form data field defined currently on the form information (for example form of the proposal document for improvement), and stores a next serial number as the serial number of the present form data field, in the form information buffer 402 through the drawing controller 404 in FIG. 4, in relation to the form information. Thus the form data field corresponding to the range shown in FIG. 7 has the last serial number among the form data fields defined currently on the form of the proposal document for improvement.

Then, in a step S143, the CPU 305 stores set values of the character type face of the form data field, entered by the user with the pointing device on a character type face setting image frame as shown in FIG. 8 and set values of the print layout of the form data field entered by the user with the pointing device on a print layout setting image frame as shown in FIG. 9, in the form information buffer 402 through the drawing controller 404 in FIG. 4, in relation to the form information. The image frames shown in FIGS. 8 and 9 are displayed on the SCOPE 301.

Then, in response to a form information file storage command entered by the user through the display controller 403 in FIG. 4, the CPU 305 stores a set of the form data field information consisting of the print start position information, print end position information, serial number, character type face set values and print layout set values stored in the form information buffer 402 in the foregoing steps S141, S142 and S143, together with other form information contained in the form information buffer 402, in the form information file 406 through the drawing controller 404 and the file I/O unit 405 shown in FIG. 4.

As explained in the foregoing, the present second embodiment allows to arbitrarily set the character attribute etc. of the form data to be printed each of the form data fields (VAR001–VAR011) within the form of the proposal document shown in FIG. 7.

Figure 15:
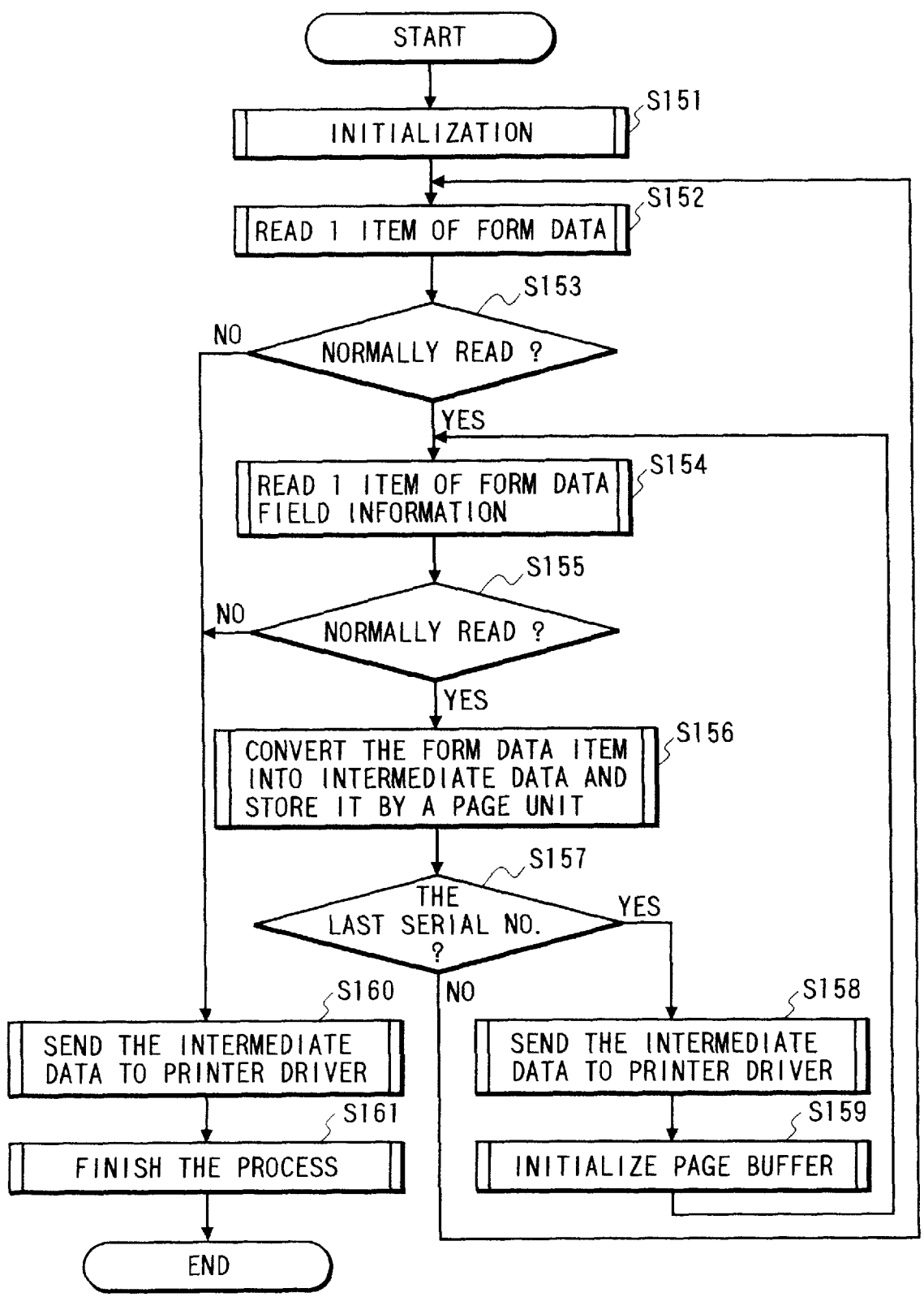
FIG. 15 is a flow chart showing the function of a form overlay print system in the second embodiment of the present invention.
Figure 16:
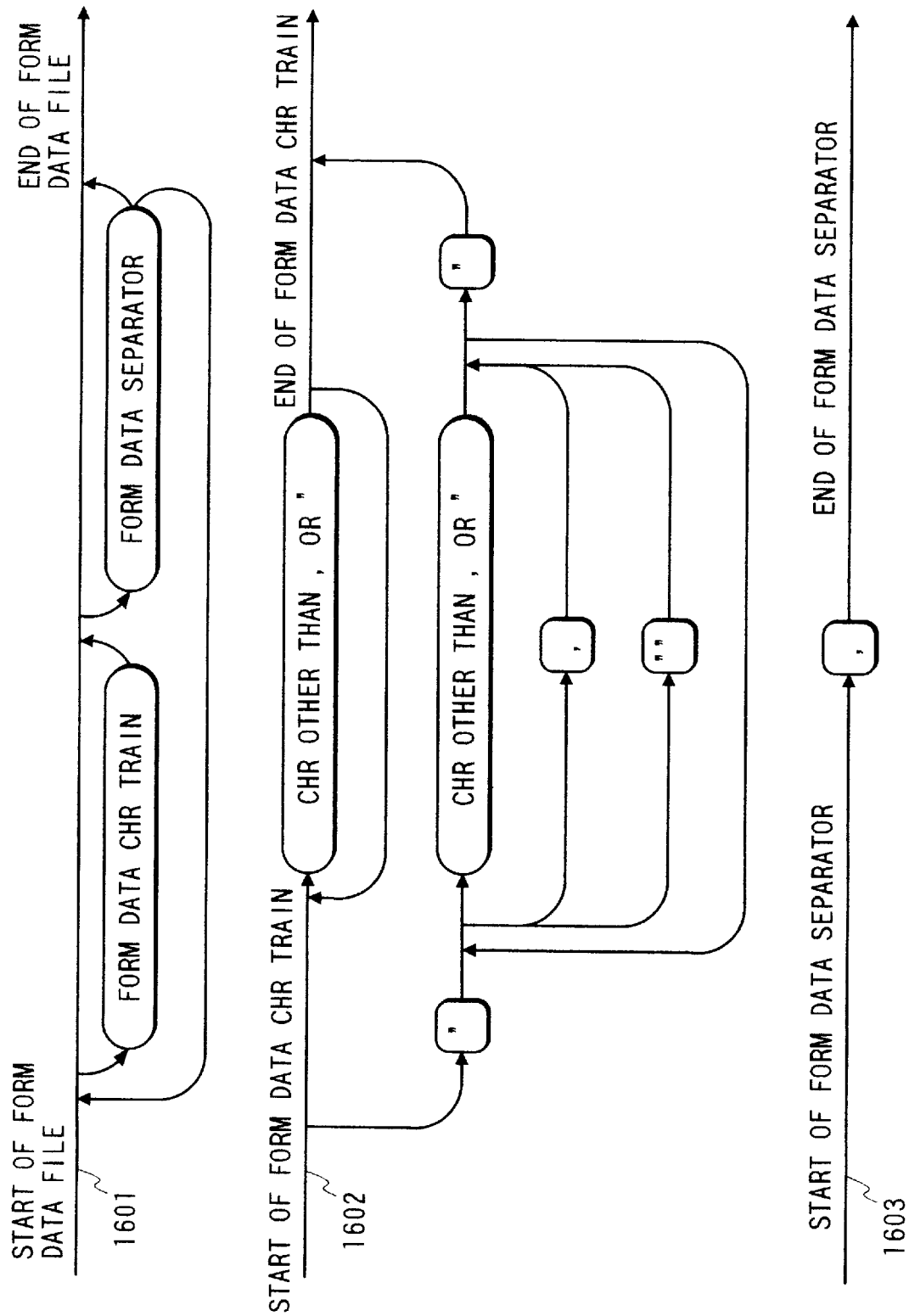
FIG. 16 is a view showing phase transitions indicating the grammer in a form data file, utilized in the form overlay printing in the second embodiment of the present invention.

FIG. 15 is a flow chart showing a form overlay printing operation in the form overlay printing system of the second embodiment, by giving different character attribute etc. to each item of the form data file by referring to the form data field information defined in the form information file. A control program indicated by this flow chart corresponds to the overlay print controller 506 in FIG. 5, and is executed by the CPU 305 in response to the entry of the form information file name, the form data file name and a form overlay print command through the user interface unit 505 in FIG. 5.

In a step S151, the CPU 305 transfers the form information of the designated form information file, read from the form information file 406 through the file I/O unit 502 in FIG. 5, to the page printer 311 through the printer driver 507, thereby effecting page registration of the form information in an unrepresented registration memory in the page printer, and temporarily stores the serial number of the form data field, constituting the last serial number among all the form data fields, in the work area of the CS 306.

Then it initializes an unrepresented page buffer in the CS 306, for storing bit map data of a page obtained by developing the form data (character codes) read from the form data file through the file I/O unit 502 in FIG. 5, utilizing font information (dot font or outline font) stored in an unrepresented font memory.

Then, in a step S152, the CPU 305 reads a data item from the head of the form data file through the file I/O unit 502 in FIG. 5, according to the grammer defining the form data in FIG. 6, and discriminates, in a step S153, whether form data item could be read properly or could not read because of a file end or a file abnormality.

If the step S153 identifies proper readout of the form data item, the CPU 305 temporarily holds the character train (character codes) of thus read form data item in the work area of the CS 306, through the overlay print controller 506 in FIG. 5.

Then, in a step S154, the CPU 305 reads a form data field in the order of serial numbers from the form information file through the file I/O unit 502 in FIG. 5, and discriminates, in a step S155, whether the form data field information could be read properly from the form information file or could not be read because of a file abnormality.

If the step S155 identifies the proper readout of the form data field information, the information is temporarily held in the work area of the CS 306.

Then, in a step S156, the CPU 305 converts the form data item character train (character codes) into intermediate data, according to the form data field information temporarily held in the work area of the CS 306, then temporarily stores the intermediate data in the work area of the CS 306, and discriminates whether the form data field information read in the step S157 has the last serial number on the form information, by comparing the serial number of the form data field information read in the step S154 and that temporarily held in the step S151.

If the step S157 identifies that the form data field information does not have the last serial number on the form information, the CPU 305 executes a process starting from the foregoing step S152. If the form data field information is identified as having the last serial number on the form information, the CPU 305 develops the intermediate data, temporarily stored in the work area of the CS 306 in the step S158, into bit map data (character pattern) through the printer driver 507, based on the print coordinate position, the character type face set values and the print layout set values in the form data field information, and transfers the above-mentioned bit map data to the page printer 311 after temporary holding in the page buffer in the CS 306 thereby causing the print of a form overlay pattern as shown in FIG. 13, in superposition with a form pattern as shown in FIG. 11, generated from the form information registered already in the page printer 311.

Then, in a step S159, the CPU 305 again initializes the page buffer initialized in the step S151 to define the reading position of the form information file at the head thereof again, and executes a process starting from the foregoing step S154.

On the other hand, if the step S153 identifies the exhaustion of the form data items to be read, or if the step S155 identifies the exhaustion of the form data field information to be read, the CPU 305 develops the intermediate data, temporarily stored in the work area of the CS 306 in the step S156, into bit map data (character pattern) through the printer driver 507, based on the print coordinate position, the character type face set values and the print layout set values in the form data field information, and transfers the above-mentioned bit map data to the page printer 311 after temporary holding in the page buffer in the CS 306, thereby causing the print of a form overlay pattern as shown in FIG. 13, in superposition with a form pattern as shown in FIG. 11, generated from the form information registered already in the page buffer 311.

Then, in a step S161, the CPU 305 terminates the present form overlay pattern printing process by sending a print end command to the page printer 311, and releases the aforementioned form information file and form data file through the file I/O unit 502 shown in FIG. 5.

As explained in the foregoing, the second embodiment enables, in the form overlay printing, to give different print attributes respectively to the data items in the form data file, by referring to the form data field information defined in the form information file.

Also in the second embodiment explained above, each form data item in the form data file is printed, based on the print coordinate position of the form data field on the form information, so that the form data can be printed in an arbitrary direction with respect to the printing sheet, in contrast to the conventional form overlay print system in which the form data can only be printed in a fixed direction with respect to the printing sheet.

For example, in the conventional form overlay print system, if the printing proceeds from the upper end of the printing sheet toward the lower end thereof, it has not been possible to at first print the form data at the lower end and then to print the form data at the upper end.

However, in the form overlay print system of the second embodiment, such inverted printing operation is made possible by defining the form data field at first at the lower end and then at the upper end.

Also in the second embodiment explained above, there can be completely eliminated the overlapping or aberration which has conventionally been encountered in the form overlay printing of the prepared form information and form data.

In the conventional form overlay print system, the print positions of the form information and the form data are not mutually correlated, and the positional alignment is only achieved by the space code, tabulator code, line feed code and new page code in the form data, solely at the responsibility in the preparation of the form data.

In contrast, in the overlay print system of the second embodiment, each form data item of the form data is always overlay printed on the form data field designed according to the form information, so that the overlapping or aberration in printing can be totally eliminated.

As explained in the foregoing, the first and second embodiments enable partially emphasized printing of the form data, by setting different character attributes respectively to the different portions of the form data, so that the highly advanced reproducing ability of the printer, attained by the recent technological advancement, can be fully exploited.

[third embodiment]

In the following there will be explained a third embodiment of the present invention, with reference to the attached drawings.

Figure 18:
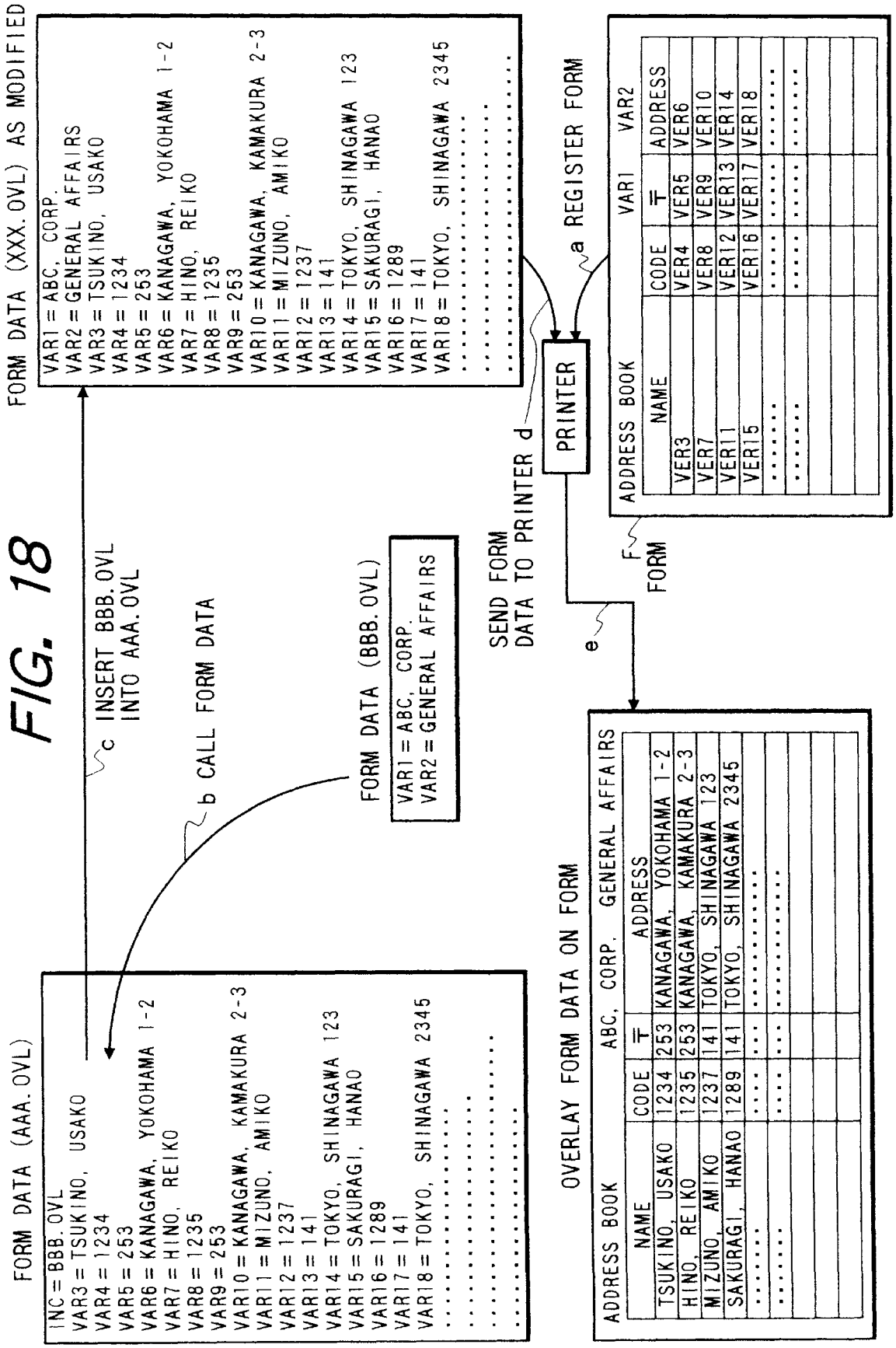
FIG. 18 is a block diagram of a computer system in which an overlay printing apparatus of third and fourth embodiments of the present invention is applied.

FIG. 18 is a schematic block diagram of a computer system in which applied is an overlay printing device constituting a third embodiment of the present invention.

Figure 19:
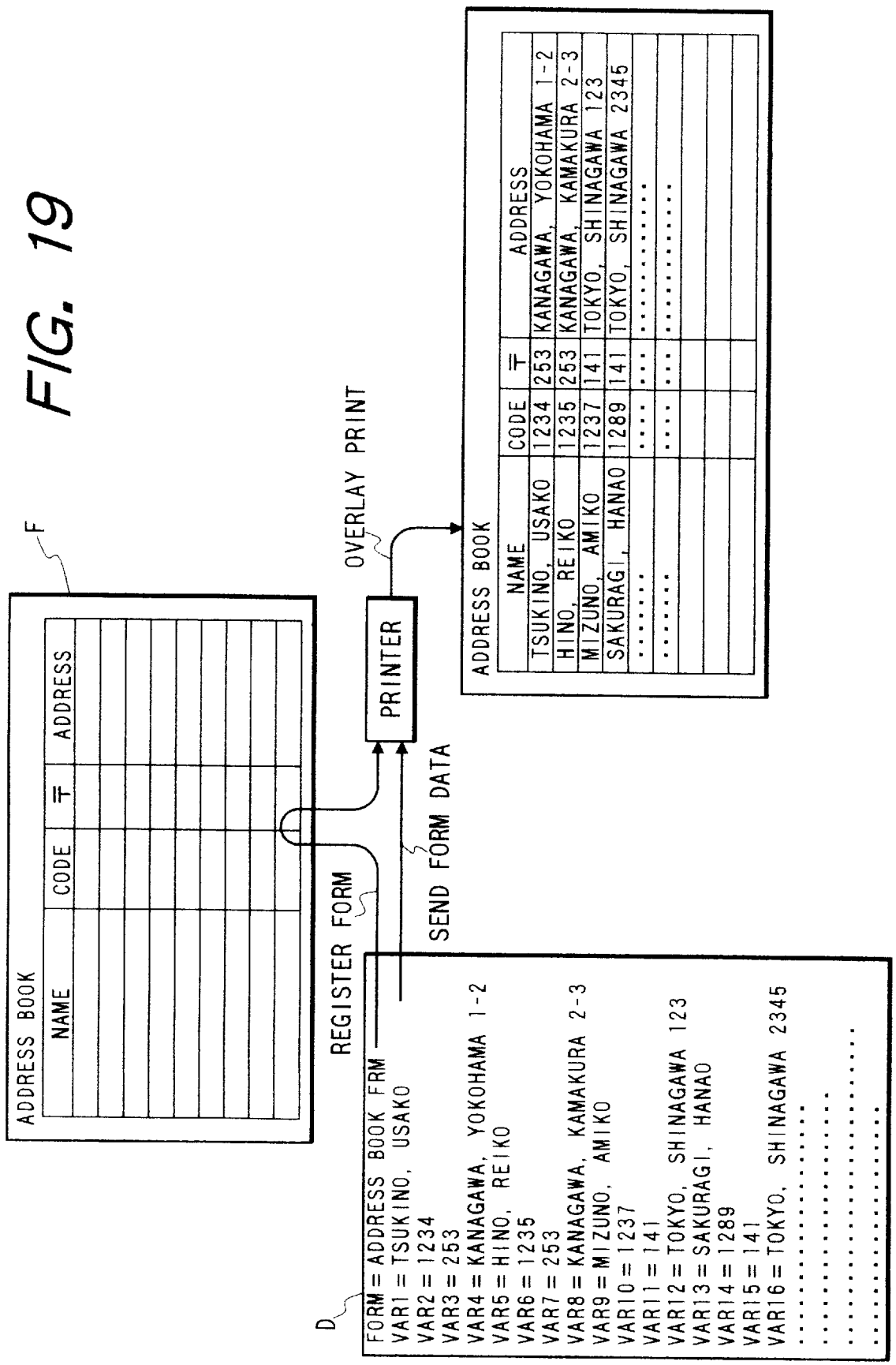
FIG. 19 is a view showing an overlay printing process of the third and fourth embodiments of the present invention.

A CPU 305 in FIG. 3 controls various data processings and the overlay printing by a page printer 311, according to programs preset in a central storage 306. Also the CPU 305 stores a form (cf. "F" in FIG. 19) entered from a keyboard 302 in a form information file 406 in an ASU 308, and also stores form data (cf. "D" in FIG. 19) entered from the keyboard 302 in a form data file 504 in the ASU 308.

The printer 311 is provided therein with memory means (such as an unrepresented RAM) for registering the form etc. Also as shown in "D" in FIG. 19, the form data contains the name of the form to be overlay printed (Form=Address list FRM in FIG. 19). Also as indicated by Var1–Var16 in FIG. 19, the form data contain the print position information, indicating the print position within the columns of the form constituted by plural vertical and horizontal lines.

Figure 17:
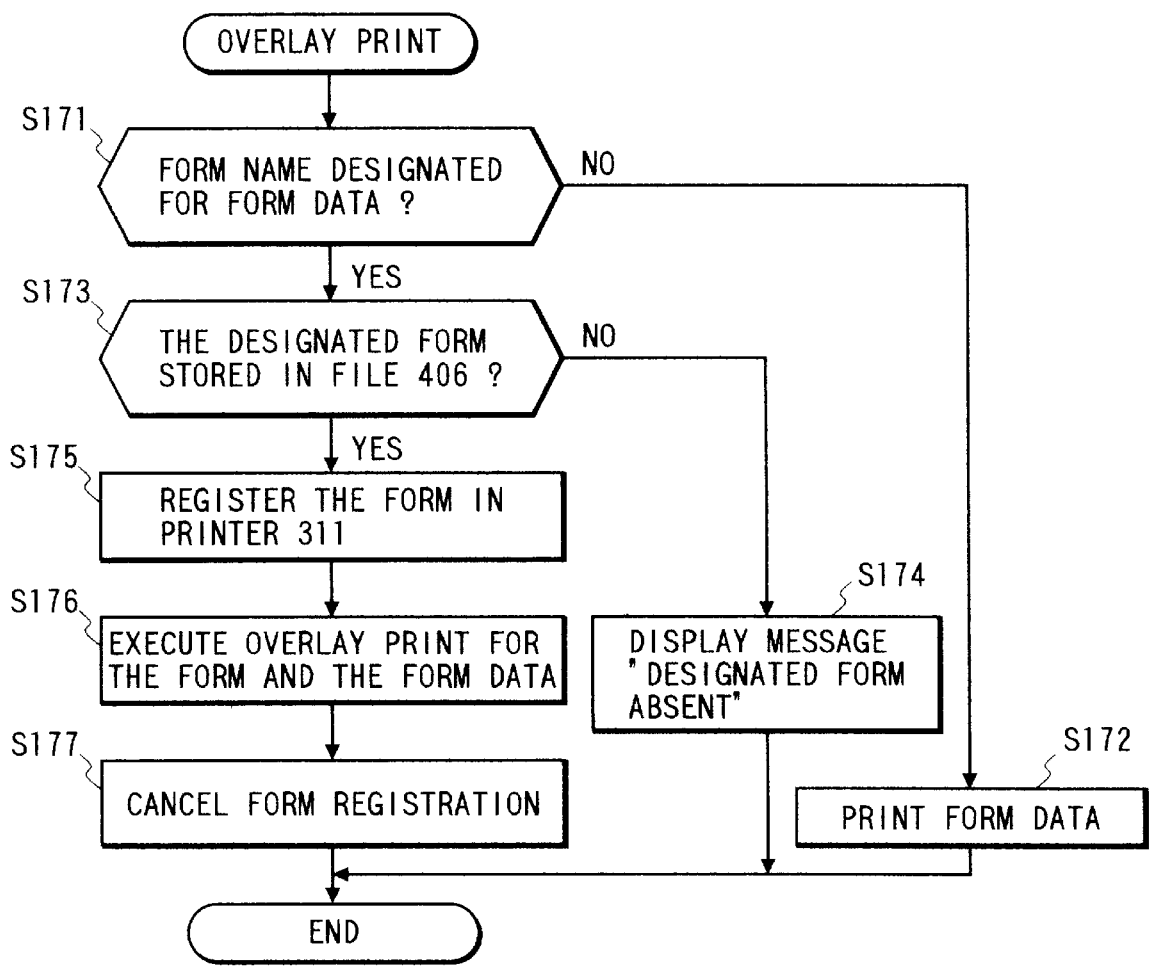
FIG. 17 is a flow chart showing an overlay printing process in a third embodiment of the present invention.

In the following there will be explained the overlay print process of the third embodiment with reference to a flow chart shown in FIG. 17.

When the overlay print mode is set immediately after the entry of the form data by the keyboard 302 or when the overlay printing is instructed for the form data entered in advance and stored in the form data file 504 of the ASU 308, the CPU 305 discriminates whether the form name is designated in the above-mentioned form data to be printed (step S171). If the form name is not designated, the form data only are printed by the printer 311 and the sequence is terminated (step S172). Even by such printing of the form data only, the user can detailedly investigate, on the recording sheet, whether the form data are appropriate.

On the other hand, if the form name is designated, there is discriminated whether the form of the above-mentioned form name is stored in the form information file 406 in the ASU 308 (step S173). If the form is not stored, a message of that effect is displayed on the SCOPE 301 (step S174) and the sequence is terminated. Such display indicating the absence of the form requests the user to enter the form.

On the other hand, if the form is stored, the form is read from the form information file 406 and registered in the memory means of the printer 311 (step S175; cf. FIG. 3). Then the aforementioned form data to be printed are transferred to the printer 311 (cf. FIG. 19) to effect the overlay printing (step S176). Then the registration of the form, registered in the step S175, is cancelled (step S177), and the sequence is terminated.

As explained in the foregoing, in the overlay printing with designation of the form data, the corresponding form is automatically registered in the printer 311. It is therefore no longer necessary to register the form in the printer 311 in advance, prior to the overlay printing, and the convenience of use is thus improved.

The present invention is not limited to the foregoing third embodiment. For example the cancellation of the form registration need not be conducted after the overlay printing. In such case, only if the form of the form name designated in the form data is not yet registered in the printer 311, such form is read from the form information file 406 and registered in the printer 311. In such case, since the form registration is not cancelled, each form is registered in the printer 311 only at the first overlay printing and thus registered form can be utilized in the second and subsequent overlay printings, so that the overlay printing can be achieved with a higher speed.

If the form name is not designated in the form data instructed for printing, there may be displayed a message of that effect, thereby requesting the addition of the form name to the form data.

In case the form of the form name designated in the form data instructed for printing is not stored in the form information file 406, there can be printed the form data only, thereby requesting the user to investigate whether the form name was erroneously entered or the form itself has not been entered.

Also the form information file 406 for storing the form in the ASU 308, or the printer 311 may be provided in a distant location, accessibly through a communication line or a LAN.

As explained in the foregoing, in the present third embodiment, at the overlay printing with designation of the form data, a corresponding form is automatically registered in the printer. It is therefore no longer necessary to register the form in the printer in advance prior to the overlay printing, and the convenience of use can thus be improved.

[fourth embodiment]

The CPU 305 in FIG. 3 controls various data processings and the overlay printing by the printer 311, according to various programs preset in the CS 306. It also registers a form (cf. "F" in FIG. 18) entered from the keyboard 302 in the memory means (not shown) such as a RAM in the printer 311, and stores plural form data (cf. "AAA.OVL" and "BBB.OVL" in FIG. 18) entered from the keyboard 302 in a file format in the form data file 504 in the ASU 308.

It is also possible to enter, as data constituting a part of each form data, a keyword for calling other form data from the subject form data and inserting such other form data (for example "Inc" in the form data AAA.OVL in FIG. 18), and to enter, after this keyword, the name of the form data file to be called (file name: form data BBB.OVL in FIG. 18). Also the keyword "Inc", indicating the calling and insertion of other form data file, can be collectively entered by the actuation of a specified function key on the keyboard 302.

Also as indicated by Var1–Var18 in FIG. 18, there are attached the print position information, indicating the print position within the form constructed by the plural vertical and horizontal lines. In the form F in FIG. 18, the print position information Var1–Var18 are indicated just for the convenience of understanding, and in fact not registered in the printer 311 as a part of the form F.

Figure 20:
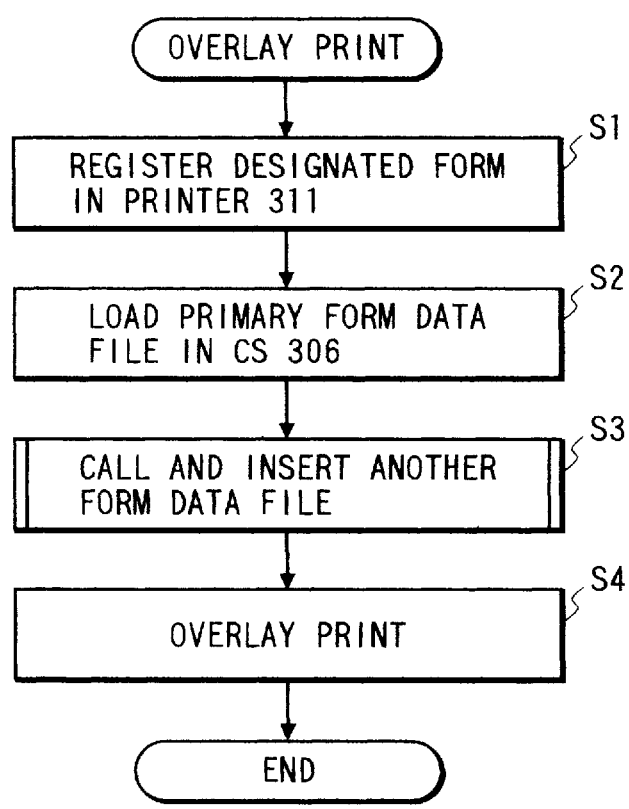
FIG. 20 is a flow chart of an overlay printing process of the fourth embodiment of the present invention.
Figure 21:
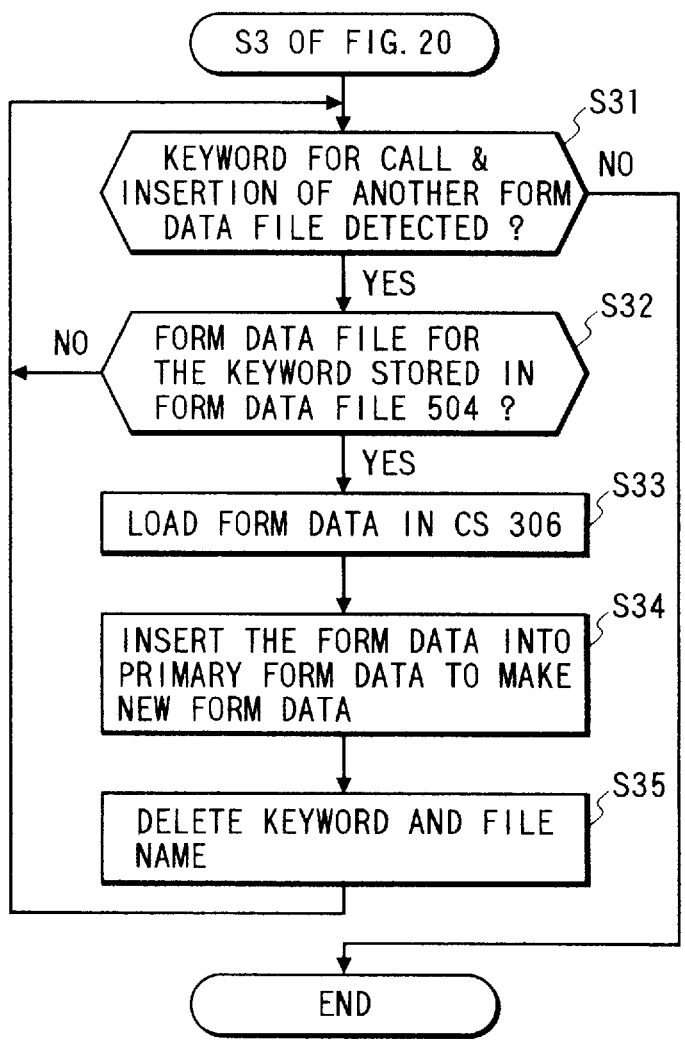
FIG. 21 is a flow chart showing a form data calling and inserting process in the fourth embodiment of the present invention.

In the following there will be explained the overlay print process in the fourth embodiment, with reference to flow charts in FIGS. 20 and 21.

At first the outline of the overlay print process will be explained according to the flow chart shown in FIG. 20. When the overlay printing is instructed, the CPU 305 registers a designated form in the printer 311 (step S1: cf. arrow "a" in FIG. 18). Then, it loads a designated form data file (form data file taken as basis) from the form data file 504 in the ASU 308 into the CS 306 (step S2).

Then the CPU 305 searches, in this basis form data file, a keyword indicating the calling and insertion of another data file and effects insertion of another form data, thereby generating new form data (step S3). Then the above-mentioned new form data are transferred to the printer 311 (cf. arrow "d" in FIG. 18) and the overlay printing is executed (step S4: cf. arrow "d" in FIG. 18), and the sequence is terminated.

In the following there will be explained the details of calling and insertion of other form data, in the step S3 in FIG. 20, with reference to the flow chart in FIG. 21.

At first the CPU 305 discriminates whether a keyword, indicating the calling and insertion of another data file, can be detected in the basis form data file (step S3). If the keyword cannot be detected, the sequence is terminated.

On the other hand, if the keyword can be detected, there is discriminated whether a form data file of a file name designated by the above-mentioned keyword is stored in the form data file 504 of the ASU 308 (step S32). If such form data file is not stored, the sequence returns to the step S31 whereby subsequent keywords are detected in succession in the basis form data file.

On the other hand, if the file of the file name designated by the keyword is stored, the form data of the above-mentioned file are loaded in the CS 306 (step S33: cf. arrow "b" in FIG. 18). Then thus loaded form data are inserted in the position of the keyword in the basis form data file, thereby generating new form data (step S34: cf. arrow "c" in FIG. 18).

Then, from thus generated new form data, the keyword and the file name of the form data designated by this keyword are deleted (step S35), and the sequence returns to the step S31 to repeat the same process for a next keyword. As a result, in the step S4 in FIG. 20, the overlay printing is executed after the insertion of the form data based on all the keywords.

In this manner the already entered plural form data can be arbitrarily combined to automatically generate new form data. For example, in case of overlay printing of a form data group A+B+C+D+E+F . . . and another form data group A+B+C+d+e+f. . . , it is no longer necessary to enter the common form data A+B+C each time, whereby the burden of form data input can be alleviated.

The present invention is not limited to the fourth embodiment explained above, but it is also possible to connect three or more form data, by calling and inserting still other form data from the called and inserted form data. It is furthermore possible to designate plural form data file names for a keyword and to display these plural file names for selection at the overlay printing.

Also the keyword and the file name of the form data designated by the keyword, in the basis form data may be given a comment, instead of being deleted (for example a comment requesting the user whether or not to delete, or to effect deletion not on the memory device but only in the loaded data).

Also the form data file 504 for storing the form data file in the ASC 308 or the printer 311 may be provided in a distant location accessibly through a communication line or a LAN.

As explained in the foregoing, the fourth embodiment allows to arbitrarily combine the already entered plural form data to generate new form data matching the purpose, thereby enabling reutilization of such form data. Consequently, in case of overlay printing of form data groups containing a common content, it becomes no longer necessary to enter the form data of such common content, and the burden for the form data input can be alleviated.

[fifth embodiment]

In the following there will be explained the function of a computer system constituting a fifth embodiment, with reference to FIG. 22 which is a flow chart of the control sequence for replacing the print data of a same content with designated print data. This process flow constitutes an addition to the printer driver program for the conventional print process, contained in the system control program stored in the CS 306 shown in FIG. 3.

The printer drive program is activated when various application programs issue a print request to the system control program. At the activation, there are executed three initialization processes of fetching the operation mode setting discriminated in the process flow explained in the following, into the printer driver, also fetching the replacement print data, to be used in the following process flow, into the printer driver, and securing and initializing a print data reading area, a discrimination print data storage area and a print output area, to be used in the following process flow. The following process flow is activated when the print data are transferred from various application programs to the printer driver program and stored in the print data reading area. This process flow will be explained in the following by each step shown in FIG. 22. At first, in a step S220, the CPU 305 discriminates whether the current operation status of the printer driver program is in an operation mode for replacing consecutive same print data. This corresponds to the discrimination of the set operation mode, read at the activation of the printer driver program, as explained above. In case the operation mode for replacing the consecutive same print data, a next step S221 discriminates whether the previously printed data are same as the print data to be currently printed, by comparing the print data in the print data reading area with those in the discrimination print data storage area. If these two print data are of a same content, a step S222 stores designated replacement print data in the print output area, by copying the replacement print data, read at the activation of the printer driver program, into the print output area.

On the other hand, if the step S220 identifies that the current operation status of the printer driver program is not in the operation mode for replacing the consecutive same print data, or if the step S221 identifies that the print data in the print data reading area are not same as those in the discrimination print data storage area, the sequence proceeds to a step S223, which stores the print data to be currently printed into the print data storage area for the next discrimination, by copying the print data of the print data reading area into the discrimination print data storage area. Then a step S224 stores the print data to be currently printed in the print output data, by copying the print data of the print data reading area into the print output area.

After the execution of the foregoing step S222 or S224, the present process is terminated, and the data in the print output area are designated for printing.

Subsequently to the present process, the data of the print output area are released to the page printer 311 in FIG. 3 in the printer driver program constituting the conventional printing method, whereby the printing operation is completed. If there remains another data item to be printed, such item is read by the printer driver program constituting the conventional printing method and the above-explained process is executed again.

As explained in the foregoing, the fifth embodiment enables to effect the printing operation by replacing the print data, if they are same as the immediately previously printed data, with designated print data.

The above-explained fifth embodiment provides a function, which is not achievable in the conventional printing technology, to replace the print data, if they are same as those immediately previously printed, with designated print data by the printer driver program. This function dispenses with the development of a replacing function in the development of individual application program, thereby alleviating the burden of the development of the application program.

Also in the fifth embodiment, the replacement print data to be provided in the printer driver program can be arbitrarily changed such as "ibid" or "same as above", so that it is no longer necessary to modify each application program for varying the replacement character train. It is thus made possible to alleviate the burden of the maintenance of the application program.

Figure 22:
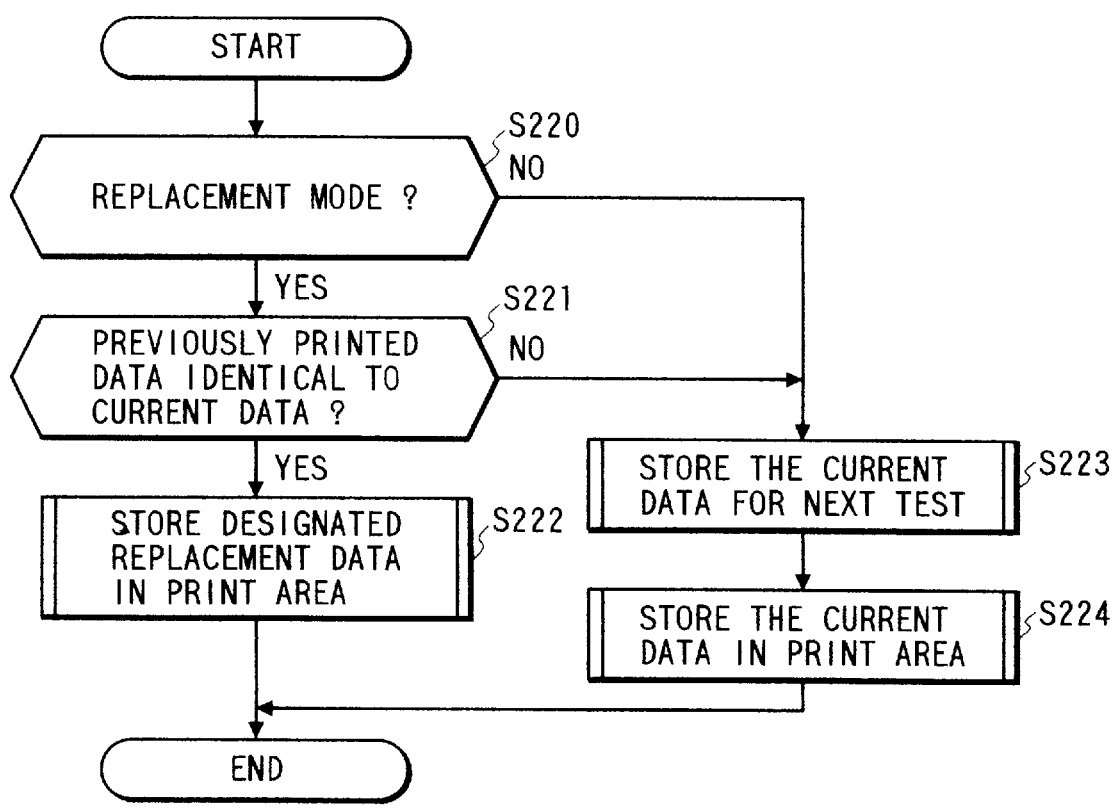
FIG. 22 is a flow chart showing a print data replacing process in a fifth embodiment of the present invention.

Also in the process flow of the fifth embodiment shown in FIG. 22, it is made possible to select whether or not to utilize the printing method of the present invention, by the setting of the operation mode in the printer driver program. Thus, in the printing of the print data which are same as those immediately previously printed, it is also possible to effect the printing operation without replacement of the print data. It is thus possible to effect the printing operation with an application program with the replacement function in the conventional manner and to accommodate an intentional request not to effect such replacement.

Also in the fifth embodiment, the process flow thereof is not incorporated in the control program in the page printer 311 shown in FIG. 3 but in the system control program stored in the CS 306. Consequently the replacement of the print data is conducted in the system control program, and thus replaced print data are in most cases replaced by a shorter character train. Thus the print data are compressed, and the burden of print data transfer through the system bus 309 and the IOC 310 in FIG. 3 can be reduced.

As explained in the foregoing, in the printing method and apparatus of the fifth embodiment, the print data which are same as those previously printed are replaced by the designated print data. It is therefore no longer necessary to incorporate the replacement logic for the print data in the development and maintenance of the application programs, and the burden therefore can be alleviated with an improvement in the productivity.

What is claimed is:

1. An information processing apparatus which controls performing of overlay printing, comprising:

memory means storing form information for making a form pattern;

setting means for setting, for each of a plurality of character pattern trains to be printed in overlay with a form pattern, attribute information of the character pattern train, based on setting instruction information entered from an external apparatus, the character pattern trains each comprising one character pattern or a predetermined unit of character patterns;

discrimination means for discriminating, for each of the plurality of character pattern trains, whether separation information is set for the character pattern train, separately from the attribute information set by said setting means, the separation information representing a separation between the character pattern train and an adjacent character pattern train; and print control means for, when said discrimination means identifies that the separation information is set for one of the plurality of character pattern trains, generating the one character pattern train based on the attribute information, and for controlling executing of overlay printing of the one character pattern train and the form pattern made based on the form information stored in said memory means.

2. An information processing apparatus according to claim 1, wherein the form pattern is a business form pattern.

3. An information processing apparatus according to claim 1, wherein said predetermined unit is a field for printing the character pattern train within the form pattern.

4. An information processing apparatus according to claim 1, wherein the attribute information indicates a print start position and a print end position in printing the character pattern train within the form pattern.

5. An information processing apparatus according to claim 1, wherein the attribute information indicates a character style of the character pattern train in said each predetermined unit.

6. An information processing apparatus according to claim 1, wherein the attribute information indicates a layout style of the character pattern train in said each predetermined unit.

7. An information processing apparatus according to claim 1, wherein the attribute information is an identification name of said each predetermined unit.

8. An information processing apparatus according to claim 1, wherein the separation information is a new page mark.

9. An information processing apparatus according to claim 1, wherein said apparatus is a host computer adapted to cause a printer to effect overlay printing of the character pattern train and the form pattern.

10. A memory medium storing a program for controlling the performing of overlay printing, comprising:

a setting step for setting, for each of a plurality of character pattern trains to be printed in overlay with a form pattern, attribute information of the character pattern train, based on setting instruction information entered from an external apparatus, the character pattern trains each comprising one character pattern or a predetermined unit of character patterns;

a discrimination step for discriminating, for each of the plurality of character pattern trains, whether separation information is set for the character pattern train, separately from the attribute information set in said setting step, the separation information representing a separation between the character pattern train and an adjacent character pattern train; and a print control step in which, when it is discriminated in said discrimination step that the separation information is set for one of the plurality of character pattern trains, the one character pattern train is generated based on the attribute information, and execution of overlay printing of the one character pattern train and the form pattern made based on the form information stored in a memory means, is controlled.

11. A memory medium storing a program according to claim 10, wherein the form pattern is a business form pattern.

12. A memory medium storing a program according to claim 10, wherein said predetermined unit is a field for printing the character pattern train within the form pattern.

13. A memory medium storing a program according to claim 10, wherein the attribute information indicates a print start position and a print end position in printing the character pattern train within the form pattern.

14. A memory medium storing a program according to claim 10, wherein the attribute information indicates a character style of the character pattern train in said each predetermined unit.

15. A memory medium storing a program according to claim 10, wherein the attribute information indicates a layout style of the character pattern train in said each predetermined unit.

16. A memory medium storing a program according to claim 10, wherein the attribute information is an identification name of said each predetermined unit.

17. A memory medium storing a program according to claim 10, wherein the separation information is a new page mark.

18. An information processing method, comprising the steps of:

setting, for each of a plurality of character pattern trains to be printed in overlay with a form pattern, attribute information of the character pattern train, based on setting instruction information entered from an external apparatus, the character pattern trains each comprising one character pattern or a predetermined unit of character patterns;

discriminating, for each of the plurality of character pattern trains, whether separation information is set for the character pattern train, separately from the attribute information set in said setting step, the separation information representing a separation between the character pattern train and an adjacent character pattern train; and a print control step in which, when it is discriminated in said discrimination step that the separation information is set for one of the plurality of character pattern trains, the one character pattern train is generated based on the attribute information, and execution of overlay printing of the one character pattern train and the form pattern made based on the form information stored in a memory means, is controlled.

19. A method according to claim 18, wherein the form pattern is a business form pattern.

20. A method according to claim 18, wherein said predetermined unit is a field for printing the character pattern train within the form pattern.

21. A method according to claim 18, wherein the attribute information indicates a print start position and a print end position in printing the character pattern train within the form pattern.

22. A method according to claim 18, wherein the attribute information indicates a character style of the character pattern train in said each predetermined unit.

23. A method according to claim 18, wherein the attribute information indicates a layout style of the character pattern train in said each predetermined unit.

24. A method according to claim 18, wherein the attribute information is an identification name of said each predetermined unit.

25. A method according to claim 18, wherein the separation information is a new page mark.

26. An information processing apparatus according to claim 1, wherein said print control means outputs the one generated character pattern train to a printer after registering the form pattern in the printer.

27. An information processing apparatus according to claim 26, wherein said print control means controls the printer to execute overlay printing of the one character pattern train outputted to the printer and the form pattern registered in the printer.

28. A memory medium according to claim 10, wherein said print control step includes outputting the one generated character pattern train to a printer after registering the form pattern in the printer.

29. A memory medium according to claim 28, wherein said print control step includes controlling the printer to execute overlay printing of the one character pattern train outputted to the printer and the form pattern registered in the printer.

30. A method according to claim 18, wherein said print control step includes outputting the one generated character pattern train to a printer after registering the form pattern in the printer.

31. A method according to claim 30, wherein said print control step includes controlling the printer to execute overlay printing of the one character pattern train outputted to the printer and the form pattern registered in the printer.

* * * * *

UNITED STATES PATENT AND TRADEMARK OFFICE
CERTIFICATE OF CORRECTION

PATENT NO. : 5,878,198

DATED : March 2, 1999

INVENTOR(S) : KEIICHIRO YUASA, ET AL.

It is certified that error appears in the above-identified patent and that said Letters Patent is hereby corrected as shown below:

COLUMN 2

Line 5, "following" should read --the following--.

COLUMN 4

Line 4, "same" should read --the same--;
    Line 6, "same" should read --the same--;
    Line 16, "same" should read --the same--;
    Line 18, "same" should read --the same--;
    Line 26, "is" should read --is a--; and
    Line 37, "grammer" should read --grammar--.

COLUMN 5

Line 2, "grammer" should read --grammar--.

COLUMN 6

Line 32, "from" should read --from the--.

COLUMN 8

Line 7, "grammer" should read --grammar--;
    Line 9, "grammer" should read --grammar--; and
    Line 14, "grammer" should read --grammar--.

COLUMN 9

Line 46, "each" should read --in each--.

UNITED STATES PATENT AND TRADEMARK OFFICE
CERTIFICATE OF CORRECTION

PATENT NO. : 5,878,198
DATED : March 2, 1999
INVENTOR(S) : KEIICHIRO YUASA, ET AL.

It is certified that error appears in the above-identified patent and that said Letters Patent is hereby corrected as shown below:

COLUMN 10

Line 33, "read" should read --reads--;
    Line 39, "grammer" should read --grammar--; and
    Line 55, "hold" should read --held--.

COLUMN 12

Line 25, "grammer" should read --grammar--.

COLUMN 13

Line 34, "attribute etc." should read --attribute, etc.,--;
    Line 59, "grammer" should read --grammar--;
    Line 61, "not" should read --not be--; and
    Line 65, "of" should read --of the--.

COLUMN 15

Line 25, "solely at the respon-" should read --and must thus be the responsibility of the person who prepares--;
    Line 26, "sibility in the preparation of" should be deleted; and
    Line 44, "applied is" should read --is applied--.

COLUMN 16

Line 37, "and" should read --and the--.

COLUMN 17

Line 10, "other" should read --another--;
    Line 54, "Then" should read --Then the--; and
    Line 58, "from" should read --from the--.

UNITED STATES PATENT AND TRADEMARK OFFICE
CERTIFICATE OF CORRECTION

PATENT NO. : 5,878,198

DATED : March 2, 1999

INVENTOR(S) : KEIICHIRO YUASA, ET AL.

It is certified that error appears in the above-identified patent and that said Letters Patent is hereby corrected as shown below:

COLUMN 18

Line 61, "same" should read --the same--; and
    Line 64, "are of a" should read --have the--.

COLUMN 19

Line 5, "same" should read --the same--;
    Line 27, "same" should read --the same--;
    Line 31, "same" should read --the same--;
    Line 49, "same" should read --the same--;
    Line 61, "thus" should read --the thus--; and
    Line 67, "same" should read --the same--.

Signed and Sealed this

Eighth Day of February, 2000

Q. TODD DICKINSON

*Attest:*

*Attesting Officer*      *Commissioner of Patents and Trademarks*